US008759776B2

(12) United States Patent
Nemirovsky

(10) Patent No.: US 8,759,776 B2
(45) Date of Patent: Jun. 24, 2014

(54) TERAMOS-TERAHERTZ THERMAL SENSOR AND FOCAL PLANE ARRAY

(75) Inventor: Yael Nemirovsky, Haifa (IL)

(73) Assignee: Technion Research and Development Foundation Ltd., Haifa (IL)

( * ) Notice: Subject to any disclaimer, the term of this patent is extended or adjusted under 35 U.S.C. 154(b) by 211 days.

(21) Appl. No.: 13/141,694

(22) PCT Filed: Dec. 22, 2009

(86) PCT No.: PCT/IL2009/001205
§ 371 (c)(1),
(2), (4) Date: Sep. 13, 2011

(87) PCT Pub. No.: WO2010/076783
PCT Pub. Date: Jul. 8, 2010

(65) Prior Publication Data
US 2011/0315880 A1    Dec. 29, 2011

Related U.S. Application Data

(60) Provisional application No. 61/141,798, filed on Dec. 31, 2008, provisional application No. 61/248,926, filed on Oct. 6, 2009.

(51) Int. Cl.
*G01J 5/02*    (2006.01)
*G01T 1/24*    (2006.01)

(52) U.S. Cl.
USPC ................... 250/340; 250/341.1; 250/339.02; 250/358.1; 250/370.01; 250/370.08

(58) Field of Classification Search
USPC ......... 250/340, 341.1, 339.02, 358.1, 370.01, 250/370.08
See application file for complete search history.

(56) References Cited

U.S. PATENT DOCUMENTS

| | | | | |
|---|---|---|---|---|
| 5,122,666 A * | 6/1992 | Turnbull | ................... | 250/338.3 |
| 2006/0244067 A1* | 11/2006 | Socher et al. | ................ | 257/350 |
| 2006/0255275 A1* | 11/2006 | Garman et al. | ............ | 250/338.1 |
| 2007/0278407 A1* | 12/2007 | Wood et al. | ................ | 250/341.1 |
| 2008/0237446 A1* | 10/2008 | Oshikubo et al. | .......... | 250/208.1 |

* cited by examiner

*Primary Examiner* — David Porta
*Assistant Examiner* — Abra Fein
(74) *Attorney, Agent, or Firm* — Oren Reches

(57) ABSTRACT

A TeraMOS sensor based on a CMOS-SOI-MEMS transistor, thermally isolated by the MEMS post-processing, designed specifically for the detection of THz radiation which may be directly integrated with the CMOS-SOI readout circuitry, in order to achieve a breakthrough in performance and cost. The TeraMOS sensor provides a low-cost, high performance THz passive or active imaging system (roughly in the range of 0.5-1.5 THz) by combining several leading technologies: Complementary Metal Oxide Semiconductor (CMOS)-Silicon on Insulator (SOI), Micro Electro Mechanical Systems (MEMS) and photonics. An array of TeraMOS sensors, integrated with readout circuitry and driving and supporting circuitry provides a monolithic focal plane array or imager. This imager is designed in a commercial CMOS-SOI Fab and the MEMS micromachining is provided as post-processing step in order to reduce cost. Thus the CMOS transistors and technology provide the sensors as well as the signal processing and additional readout circuitry both in the pixels as well as around the sensor array.

32 Claims, 18 Drawing Sheets

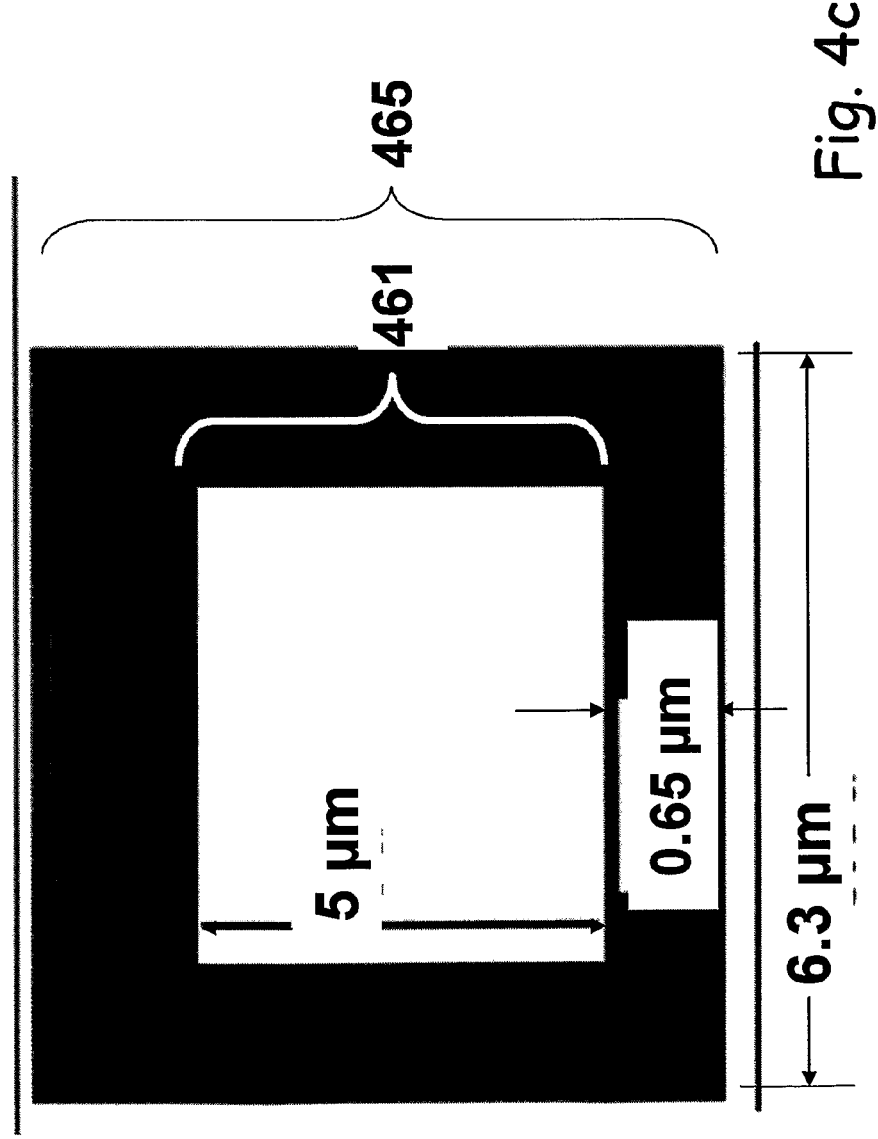

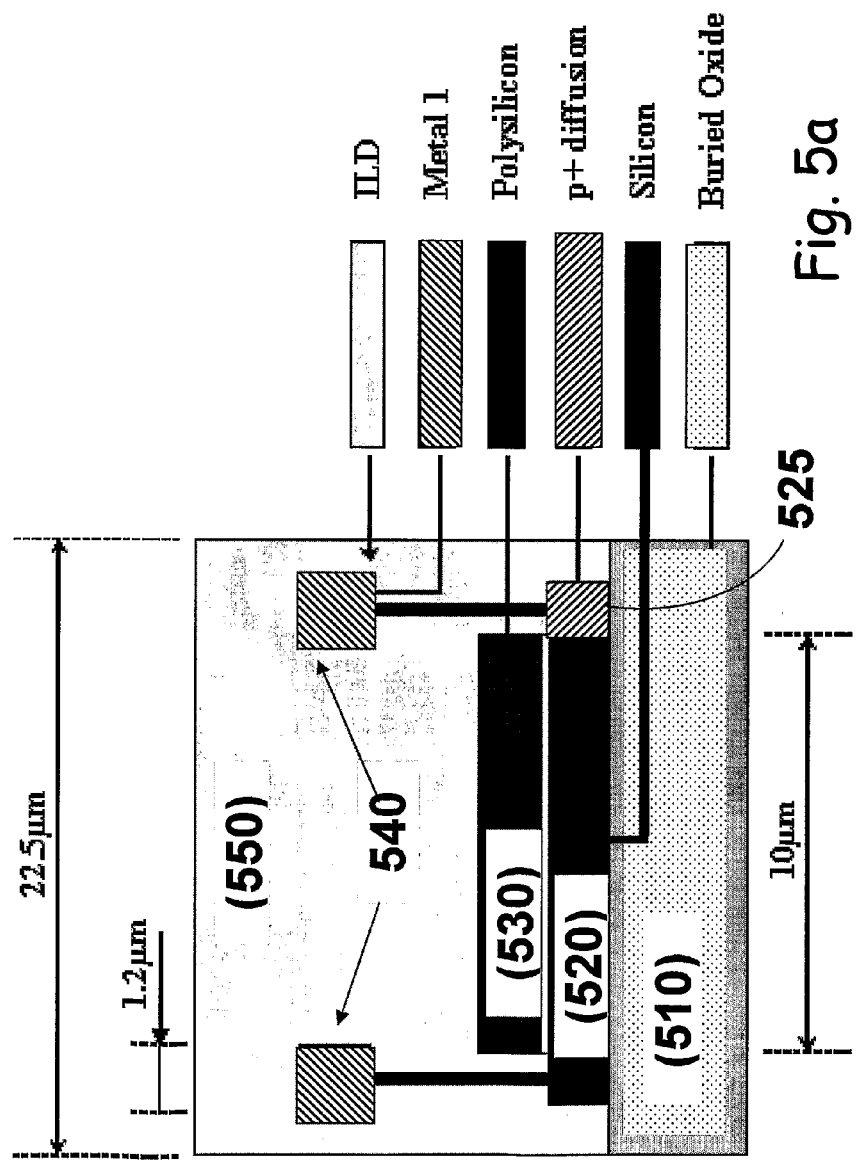

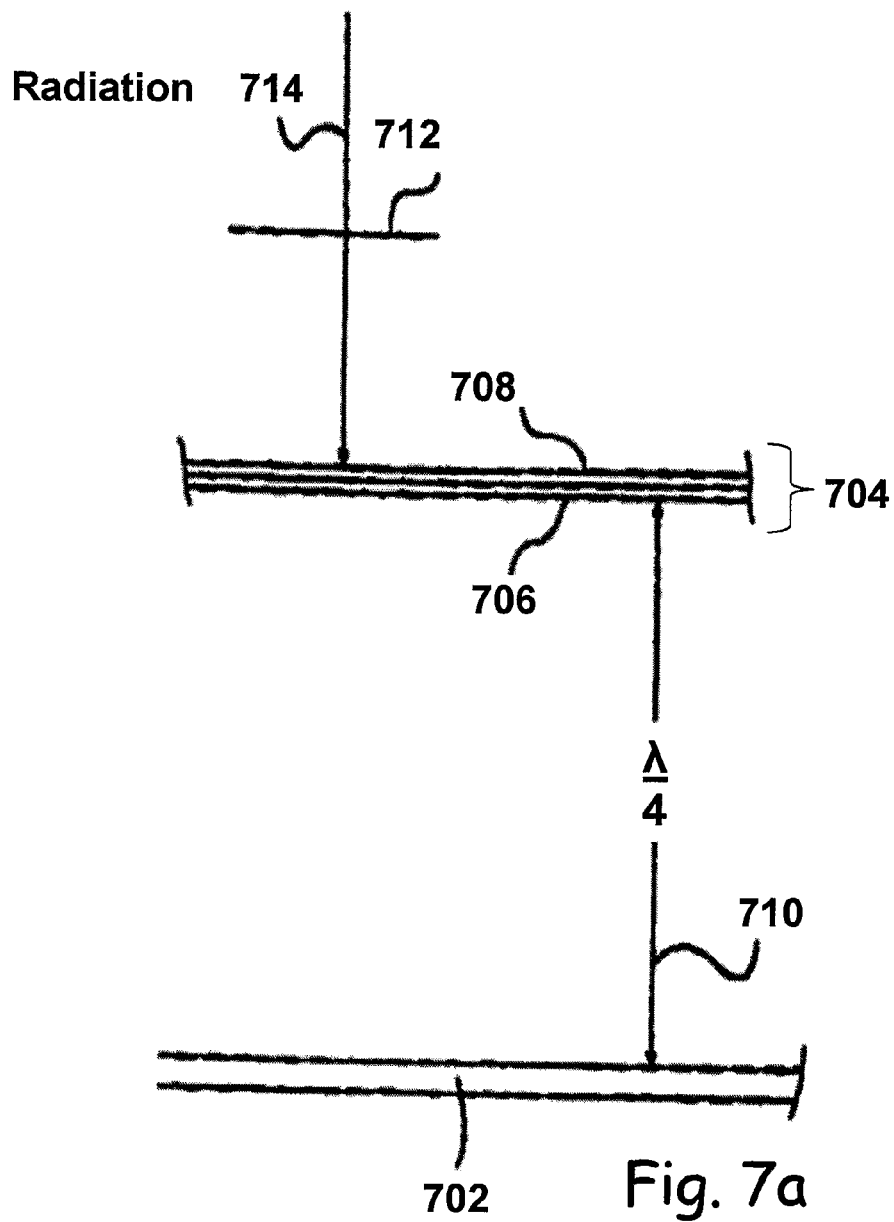

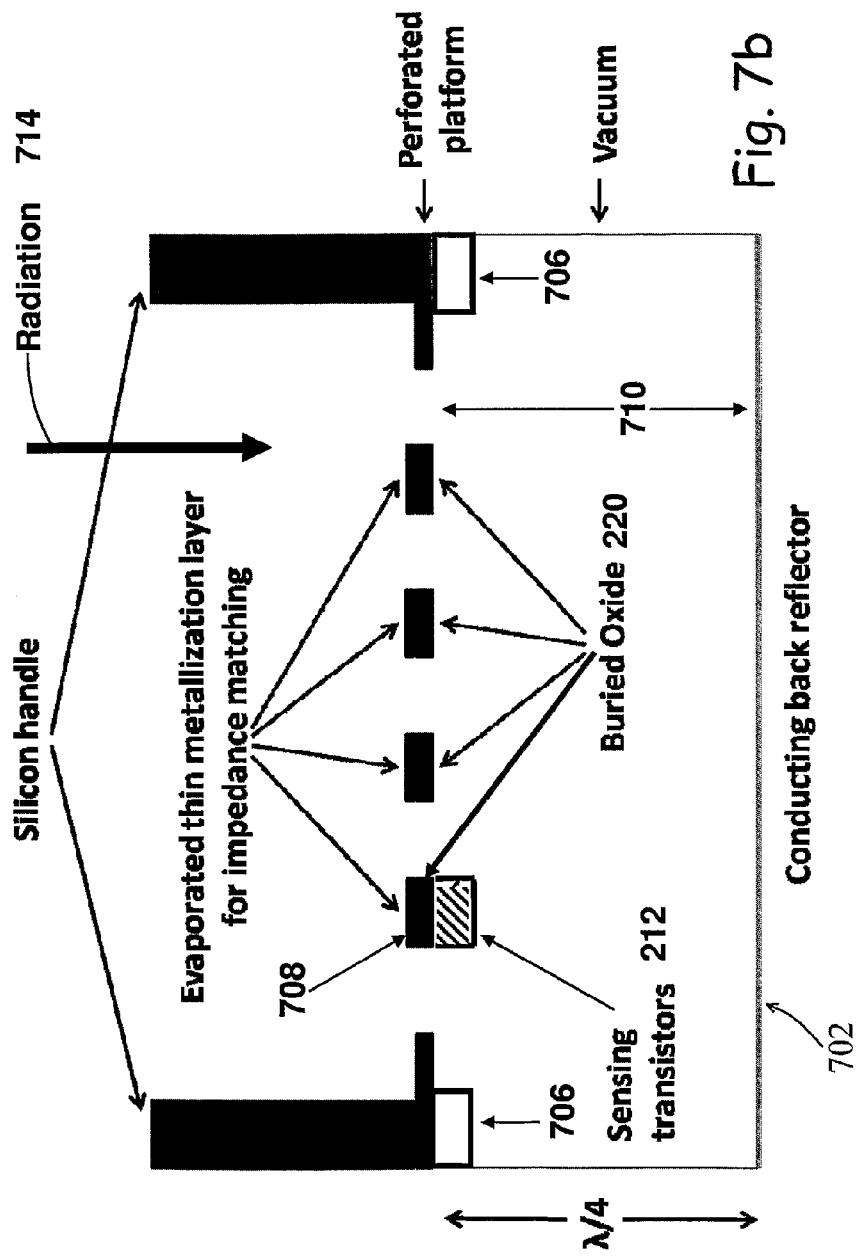

TERAMOS-TERAHERTZ THERMAL SENSOR AND FOCAL PLANE ARRAY

FIELD OF THE INVENTION

The present invention relates generally to imaging technology, and more particularly to a method and a system to provide a Focal Plane Array of micro-machined thermally isolated sensors with the supporting and readout circuitry for a low cost, high performance THz passive or active imaging system roughly in the range of 0.5-1.5 THz, by combining three leading technologies: Complementary Metal-Oxide Semiconductor-Silicon on Insulator (CMOS-SOI), Micro Electro Mechanical Systems (MEMS) post-processing and photonics (in the THz radiation range of the electromagnetic spectrum).

BACKGROUND OF THE INVENTION

The THz radiation range is usually considered between 0.3-3.0 THz. Within this range, high performance, low-cost passive and or active imaging at 0.5-1.5 terahertz (THz) has well-established benefits, but has been little explored. There is adequate radiation from terrestrial bodies at 300 K to allow passive remote sensing as well as high-resolution images of hidden objects covered under clothing or other materials. Applications include concealed weapon detection, surveillance cameras, astronomy, non-destructive material testing, as well as ample bio and medical applications. For example, THz imaging can distinguish between normal skin tissue and tumors better than both the trained eye and infrared imaging, since THz radiation penetrates a few millimeters into the skin. An example of the use of this type of radiation is described in the paper "T-Rays vs. Terrorists", from IEEE Spectrum of July 2007 (see also: www.spectrum.ieee.org). More information on the Terahertz region may be found in Wikipedia Website, (www.wikipedia.org).

Because THz radiation is non-ionizing and its associated radiation power is low, it is also safe. Prior art FIG. 1 shows the terahertz frequency range (within $10^{11}$ to $10^{13}$ Hz 103 beyond the megahertz ($10^6$) and gigahertz ($10^9$) ranges. THz normally refers to the region of the electromagnetic spectrum between 300 gigahertz ($3\times10^{11}$ Hz) and 3 terahertz ($3\times10^{12}$ Hz), corresponding to the sub-millimeter wavelength range between 1 millimeter (high-frequency edge of the microwave band) and 100 micrometer (long-wavelength edge of far-infrared light).

The state of the art of THz imaging is summarized in reported literature. A good summary is presented by Arttu Luukanen, of VTT/mililab (www.vtt.fi/millilab). THz imaging can be classified into passive and active imaging. In passive imaging there is detection of the blackbody radiation which is emitted spontaneously by all bodies, according to their temperature and wavelength, and formulated by Planck radiation law. In active imaging, the detected body is illuminated by external sources and the reflected radiation is detected.

The two modes of imaging are compared in Table I, quoted from reporting literature on the WEB:

TABLE I

Passive

+Undetectable (excluding LO in heterodyne detection)
+No safety concerns
+Images easy to understand TABLE I-continued +No $1/r^2$ independence of SNR (better range)
−Stringent requirements on sensitivity
−Sensitive to external conditions
−Favors focal plane array architectures (expensive!)

Active

+Relaxed requirements on sensitivity
+Favors scanning architectures
+Cheaper
−Limited range (SNR $\propto r^2$)
−Detectable
−Harder image interpretation
−Angle diversity for short ranges only
−Safety concerns
−Issues with irradiating non-cooperative subjects/covert surveillance Passive imaging offers considerable advantages compared to active imaging. Passive imaging is undetectable and offers covert surveillance, does not introduce safety concerns, offers better range, does not require multiple and expensive THz sources, images are easier to interpret and favors focal plane array architectures.

The state of the art of available technologies for THz imaging is summarized in Table II, quoted from reported literature on the WEB:

TABLE II summary of state of the art available technologies for Thz imaging.

| Technology | Sensitivity | Cost | Performance |
|---|---|---|---|
| Coherent Heterodyne | good | Huge | >1 THz |
| Coherent direct (with MMIC preamplification) | good | Large | ~200 GHz |
| Cryogenic Microbolometers | good | Large | >1 THz |
| Incoherent direct (with no amplification) | Moderate to good | Small | 600 GHz |
| Uncooled Antenna Coupled Microbolometers | Poor (active only) | Low | >1 THz |
| Plasma transistors | Moderate | Low | ~1 THz |
| The present invention | High | Low | >1 THz |

Source: Microsensor seminar, presented by Arttu Luukanen, www.vtt.fi/millilab.

According to Table II, low cost imaging should be based on antenna coupled bolometers but the state-of-the-art sensitivity is poor and hence only active imaging is possible. Cryogenic microbolometers (based on superconductors) may provide good sensitivity but the required temperature of operation is 10K or lower, thus increasing considerably the system cost. Coherent detection using MMIC pre-amplification is limited to ~200 GHz. This technology offers good sensitivity but system cost is large. Coherent heterodyne detection may be applied to THz radiation, with good sensitivity but at huge cost.

It is seen that low cost performance, based on current approaches of Antenna Coupled Micro Bolometers (ACMB) is limited only to Active Imaging Systems. ACMB performance is typically Noise Equivalent Power (NEP) ~50-100 pWatt/Hz$^{1/2}$ and pixel count is limited by real estate (since pixel dimension should be of the order of the wavelength and is therefore 600 microns for 0.5 THz radiation).

Thermal sensors and the FPA are well-explained in the first reference below, (U.S. Pat. No. 7,489,024), by at least one of the inventors of the current invention, and is incorporated herein by said reference.

This and other prior art references are contained in the following list of publications:
1. E. Socher, O. Degani and Y. Nemirovsky, "TMOS-Infrared uncooled sensor and focal plane array", U.S. Pat. No. 7,489,024, issued Feb. 10, 2009.

2. E. Socher, S. M. Beer and Y. Nemirovsky, "Temperature Sensitivity of SOI-CMOS Transistors for Use in Uncooled Thermal Sensing", IEEE Trans. Electron Devices, Vol. 52, no. 12, pp. 2784-2790, December 2005.
3. L. Gitelman, S. Stolyarova, S. Bar-Lev, Z. Gutman, Y. Ochana, and Y. Nemirovsky, "CMOS-SOI-MEMS transistor for uncooled IR Imaging", IEEE Trans. Electron Devices", Vol. 56(9), pp. 1935-1042, September 2009.
4. L. Gitelman, Z. Gutman, S. Bar-Lev, S. Stolyarova and Y. Nemirovsky, "CMOS-SOI-MEMS Transistor for Infrared Imaging", IEEE/LEOS International conference on Optical MEMS & Nanophotonics, Freiburg, Germany, August 2008. ISBN: 978-1-4244-1917-3
5. L. Gitelman, Z. Gutman, S. Bar-Lev, S. Stolyarova and Y. Nemirovsky, "TMOS Novel Uncooled Sensors—Theory and Practice", IEEE COMCAS 2008, The International IEEE Condference on Microwaves, Communications, Antennas and Electronic Systems", Tel Aviv, Israel, May 13-14, 2008. ISBN: 978-1-4244-2097-1
6. E. Socher (Ph.D thesis performed at Technion-Israel Institute of Technology.), "CMOS Infrared Imagers", (1999-2005). (supervised by Y. Nemirovsky).
7. L. Gitelman (M.Sc thesis performed at Technion-lsrael Institute of Technology.), "Study of micromachined transistors as uncooled sensors for IR imaging", (2004-2006) (supervised by Y. Nemirovsky).
8. Zivit Gutman (M.Sc.), "Study of CMOS-SOI-MEMS transistors and systems", (2006—thesis performed at Technion-Israel Institute of Technology). (supervised by Y. Nemirovsky).

SUMMARY OF THE INVENTION

Accordingly, it is a principal object of the present invention to provide a new type of THz sensor, named herein as the TeraMOS sensor, which may be directly integrated with the CMOS-SOI readout circuitry, in order to achieve a breakthrough in performance and cost. The low cost is emphasized here because this will allow the deployment of a large number of such focal plane array (FPA) imagers in point-of-care medical clinics (dermatologists for example) as well as in crowded places, providing highly efficient detection of terrorists' threats.

It is another object of the present invention to provide a TeraMOS low-cost, high performance THz passive or active imaging system (roughly in the range of 0.5-1.5 THz) by combining several leading technologies: Complementary Metal Oxide Semiconductor (CMOS)-Silicon on Insulator (SOI), Micro Electro Mechanical Systems (MEMS) and photonics.

The TeraMOS sensor is based on a CMOS-SOI-MEMS transistor, thermally isolated by the MEMS post-processing, designed specifically for the detection of THz radiation. It is an extension of the TMOS sensor, already patented in U.S. Pat. No. 7,489,024, issued Feb. 10, 2009, the disclosure of which is hereby incorporated herein by reference. This construction has been extensively studied at the Technion, Haifa, Israel, and is also based on a CMOS-SOI-MEMS transistor, but is designed specifically to sense IR radiation.

It is yet another objective of the current invention to provide an array of the TeraMOS sensors, integrated with their readout circuitry and driving and supporting circuitry to provide a monolithic focal plane array or imager. This imager is designed in a commercial CMOS-SOI Fab and the MEMS micromachining is provided as post-processing step in order to reduce cost. Thus the CMOS transistors and technology provide the sensors as well as the signal processing and additional readout circuitry both in the pixels as well as around the sensor array.

The Terahertz imaging system of the present invention may be either active or passive. It is based on the TeraMOS sensors of the present invention. The system and sensor are expected to achieve breakthrough performance far beyond the state of the art. The present invention is aimed towards achieving a breakthrough or paradigm shift by introducing several innovations, summarized below.

It is another principal object of the present invention to provide a TeraMOS THz imaging device that provides a monolithic focal plane array which integrates sensors with CMOS-SOI readout circuitry.

It is still another principal object of the present invention to provide very large scale integrated (VLSI)-CMOS readout architecture based on a novel variable effective pixel size approach and integrated low-noise readout circuitry.

The Terahertz sensor operates like an "active bolometer" and is based on a thermally isolated CMOS-SOI-MEMS transistor. The thermal isolation is based on Technion-Israel Institute of Technology unique MEMS post-processing technology, as further described herein.

The characteristics and performance of the TeraMOS sensors of the present invention optimize and tune performance by direct control of the gate voltage. This allows switching or modulation of bias voltage to reduce self heating, reduce noise, and reduce circuit complexity while enhancing performance. In addition, operation at sub-threshold offers higher temperature sensitivity and lower noise. Furthermore, active operation offers a number of novel readout designs for thermal imaging in monolithic CMOS-SOI technology that can be borrowed from the highly advanced CMOS Image Sensors technology, well-established in the visible range.

The Terahertz sensor (TeraMOS) operates at sub-threshold (where the temperature coefficient of the current is highest)- extension of the TMOS concept. The operation is in a diode-like design, where drain and gate terminals are connected and bulk and source terminals are connected. Thus, the sensor requires only 2 terminals, which improves the thermal isolation.

The Terahertz sensor (TeraMOS) may be operated at 300° K or at 77° K (but is not restricted to this temperature), with the lower operating temperature being used to reduce noise and improve the performance.

The innovative Terahertz sensor (TeraMOS) is based on a unique design to achieve low thermal conductivity and low thermally active volume. The design is based on perforated platform, where the holes are achieved by MEMS post-processing. The typical side dimension of the holes is less than $\lambda/10$ and the platform dimensions correspond to pixel dimensions. The sensing transistor is located on this platform and its dimensions are smaller than the platform. The platform, which absorbs the radiation, is thinner than the transistor and therefore contributes lower thermal mass.

The TeraMOS device of the present invention uses a thermally isolated micro-machined (released) CMOS-SOI transistor operating at sub-threshold, as an active device for thermal sensing. Operation at sub-threshold is preferred, since the current mechanism at sub-threshold is based on diffusion rather than drift, and has exponential temperature dependence. The TeraMOS is a thermal sensor, similar to a bolometer, but with inherent advantages since it is an active device fabricated according to matured CMOS technology. The MEMS micromachined TeraMOS transistor with its unique perforated design has low thermal mass or heat capacity ($C_{th}$) and low thermal conductivity ($G_{th}$). The low thermal conductivity is required to enhance the temperature increase of the sensor. The low thermal heat capacity is required to reduce the thermal time constant of the sensor and to allow operation at video rates.

Noise Equivalent Temperature Difference (NETD) specifies the minimum detectable temperature difference. In general, detector cooling is required to reduce the detector's own noise and to improve the NETD. In the case of the TeraMOS sensor this is required if the signals in the terahertz range are low, as encountered in passive imaging, which are based on the spontaneous blackbody radiation of bodies.

TeraMOS advantages include:
  High sensitivity (TCC of 4% or higher after optimization) and high performance (expected NETD of 500 mK or even lower);
  Low cost and manufacturability by using standard CMOS devices and the micromachining as post-processing;
  Sensor integration with readout circuitry and fabrication in a standard CMOS Fab, increases uniformity, yield and reliability;
  Sensor performance flexibility is achieved by using a CMOS transistor as a sensing element. Novel Active Pixel Sensors can be designed for THz imaging, corresponding to staring cameras in the visible light range and known as CMOS Image Sensors;
  Sub-threshold operation allows very relatively long integration times and therefore reduces noise; and
  The TeraMOS sensor may be integrated on chip with the antenna and transmission lines to maximize the fill factor of the pixel as well as the absorption of radiation by carefully matching and designing the electromagnetic parts-similarly to antenna-coupled bolometers.

A bolometer is a thermal sensor that measures radiant energy by correlating the radiation-induced change in electrical resistance with the amount of radiation absorbed. The TeraMOS is a thermal sensor, and in that sense it is similar to a bolometer, but with inherent advantages since it is an active transistor device. The TeraMOS of the present invention has low thermal mass or heat capacity ($C_{th}$) and low thermal conductivity ($G_{th}$). When incident step function blackbody THz radiation (with $P_0$ Watts) heats the transistors, the incremental temperature rise is approximately given by $$\Delta T(t) = \frac{\eta P_0}{G_{th}}(1 - e^{-t/\tau})$$

where the time constant T is proportional to $C_{th}/G_{th}$, assuming that one neglects distributed heat flow effects which lead to multiple time constants. In order to work in a video format, $\tau$ of the order of 20-70 msec is required. This temperature increase induces a corresponding increase in the transistor current, which is then detected by the analog readout. The mechanical support, thermal conductivity and electrical contacts to the transistor are determined and provided by holding arm, which physically connects the floating transistor to the silicon chip and provides thermal isolation.

A novel feature of the TeraMOS device is the use of MOS transistor operating at sub-threshold, either at 300K or at 77° K, as an active device for thermal sensing. Operation at sub-threshold is preferred, since the current mechanism at sub-threshold is based on diffusion rather than drift, and has exponential temperature dependence. The temperature coefficient of current (TCC), defined as the percentage change in current per degree, is often above 4% per Kelvin in sub-threshold and grows much higher at deeper sub-threshold levels.

Cooling the device to 77° K reduces the internal noise of the device. Since the operation is at low sub-threshold currents, the self-heating of the device is small, unlike the case of standard resistive bolometers, which require pulsed operation to combat the self-heating, thereby increasing the effective bandwidth for noise. The CMOS-SOI technology is chosen as a starting point, since the buried oxide naturally provides an etch stop for the backside removal of the substrate by Deep Reactive Ion Etching (DRIE) during the MEMS post-processing.

The use of suspended and thermally isolated CMOS-SOI-MEMS transistors, operating at sub-threshold for uncooled IR thermal imaging (TMOS devices), has been proposed and recently successfully demonstrated [see prior art references]. The present invention of the TeraMOS focal plane arrays extends these TMOS capabilities to the Terahertz spectral region.

The completely different and larger dimensions of the sensing pixels required for the TeraMOS terahertz sensing as compared to the TMOS IR sensors of the prior art patent of Ref. 1, are one of main differences between the two inventions, which resulted in the unique design of the TeraMOS sensor, based on a perforated platform. The pixel dimensions and the details of electrical and thermal design depend on the wavelength which needs to be detected, and are therefore very different for an infrared TMOS sensor and a TeraMOS sensor. In order to meet the design requirements, the "tiling" concept is introduced, where tiles are sensing-type building blocks, each acting as an individual sensor, where the reading of several sensors is added by the integrated readout. The basic "tile" (or sensing "building block") may be either with 200 micron pitch or may be with 100 micron pitch. In the latter case, a pixel of 200 microns pitch will be composed by 4 tiles, each acting as an individual sensor and each with 100 micron pitch. The reading of the 4 sensors is added by the integrated readout. A pixel of 600 micron pitch will be composed by 6*6 tiles of side length 100 micron each.

The novel "tiling" concept of sensing-type building blocks enables the achievement of a wide frequency range of operation, while dealing with the issue of real estate available on a reasonably sized die. The combination of the CMOS-SOI-MEMS technologies allows for straightforward integration of sensors and readout, which enables the realization of the "tiling" concept, which in turn enables the realization of the novel concept of variable effective pixel size, composed of combined reading of several pixels. This variable pixel approach enables the achievement of a wide frequency range of operation while dealing with the issue of the real estate available on a reasonably sized die: A die only slightly larger than 6 cm*6 cm provides an array of 256*256 pixels for 1.5 THz imaging and ~100*100 pixels for 0.5 THz imaging.

Another difference between TeraMOS terahertz sensing and TMOS IR sensors is the fact that in the terahertz region, the target blackbody signals are lower by several orders of magnitude compared with the IR signals, so that the embodiments of the present invention provide for reduced noise and improved responsivity. Noise reduction is preferably achieved by carefully selecting the CMOS SOI process and the transistor type and dimensions. Furthermore, the proposed TeraMOS may be cooled to 77° K using available, relatively low cost and by now well-established closed cycle Stirling coolers. This packaging provides the required vacuum encapsulation as well as cooled operation at low cost.

The cost of the packaging is estimated to determine approximately 70% of the final cost of the imager.

A closed cycle Stirling cooler, available commercially with MTBF (mean time between failure) of ~15,000 hours, is useful as part of an exemplary embodiment of the present invention.

The TeraMOS detector responsivity at sub-threshold may be also improved compared to that of the TMOS by using the larger pixel area to design several transistors operating in parallel and thus increasing the total current. The current design alternative embodiment is based on more advanced CMOS-SOI processes, for example IBM 0.18 um 7RFSOI technology, which is better than the 1 um process used before for infrared TMOS device fabrication.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

For a better understanding of the invention with regard to the embodiments thereof, reference is now made to the accompanying drawings, in which like numerals designate corresponding elements or sections throughout, and in which:

FIGS. 4a-4d illustrate the design of the TeraMOS sensor with the perforated platform, constructed according to the principles of the present invention, wherein:

FIG. 4a is a TeraMos sensor with an encompassing holding arm;

FIG. 4b shows the design details of the perforated platform;

FIG. 4c shows the detailed design of a single micro-machined square, wherein the platform is an array of such squares; and FIG. 4d is an overview of the holding arm, showing the two contacts to the sensing transistor;

FIGS. 5a-b show the cross-section of the transistor (FIG. 5a), holding arm (FIG. 5b) and platform (similar to 5b), constructed according to the principles of the present invention;

FIGS. 7a-b are schematic illustrations of the "$\lambda/4$" optical absorber with a separate backside reflector die, constructed according to the principles of the present invention;

DETAILED DESCRIPTION OF AN EXEMPLARY EMBODIMENT

The principles and operation of a method and an apparatus according to the present invention may be better understood with reference to the drawings and the accompanying description, it being understood that these drawings are given for illustrative purposes only and are not meant to be limiting.

Figure 1:
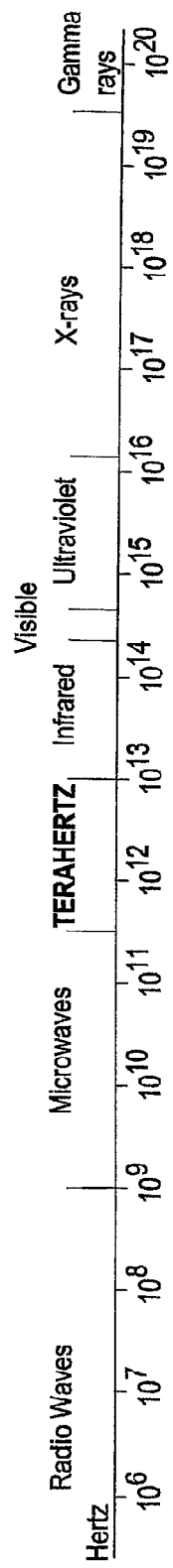
FIG. 1 shows the terahertz frequency range ($3*10^{11}$ to $1*10^{13}$ Hz) beyond the megahertz ($10^6$) and gigahertz (10 ranges.
Figure 2A:
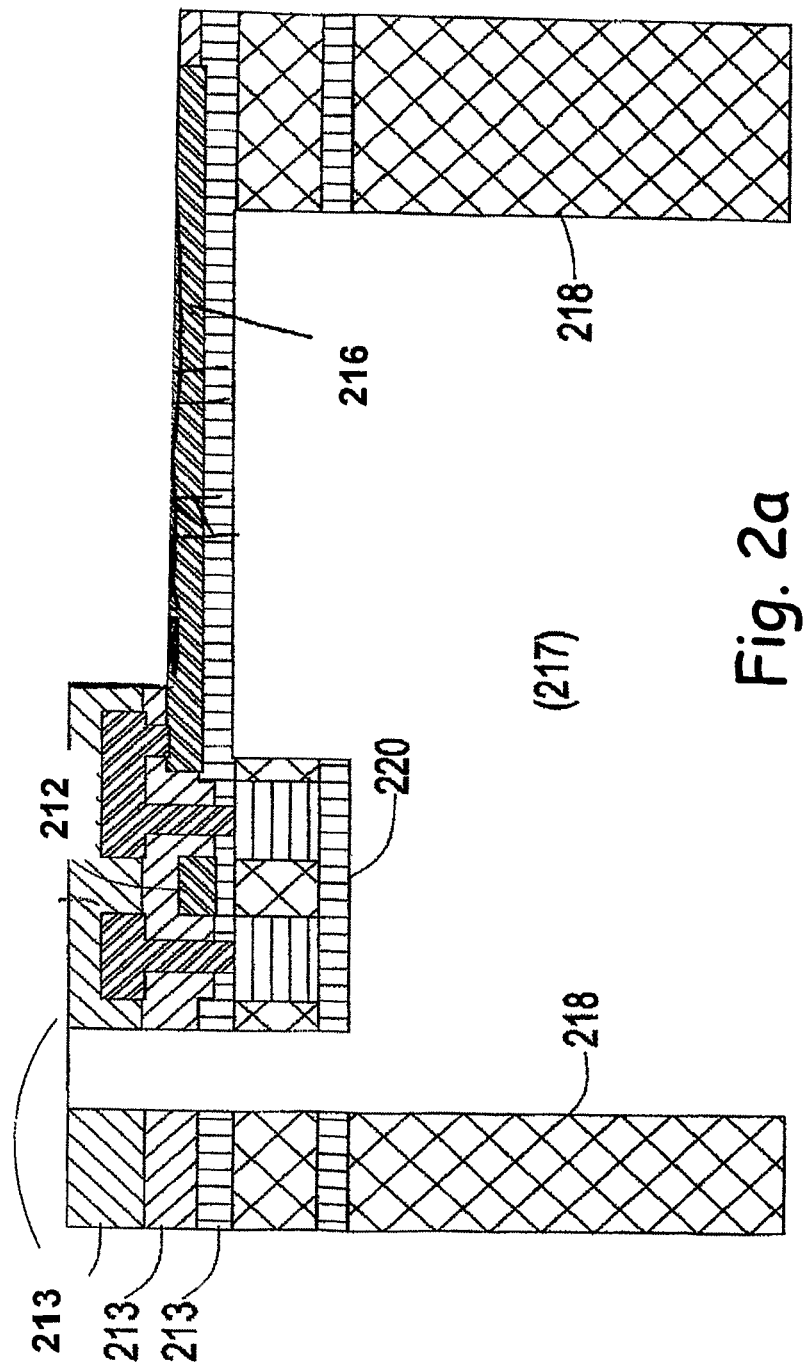
FIG. 2a is a schematic illustration of a the cross-section of the suspended transistor used in the TeraMOS sensor, constructed according to the principles of the present invention.
Figure 2C:
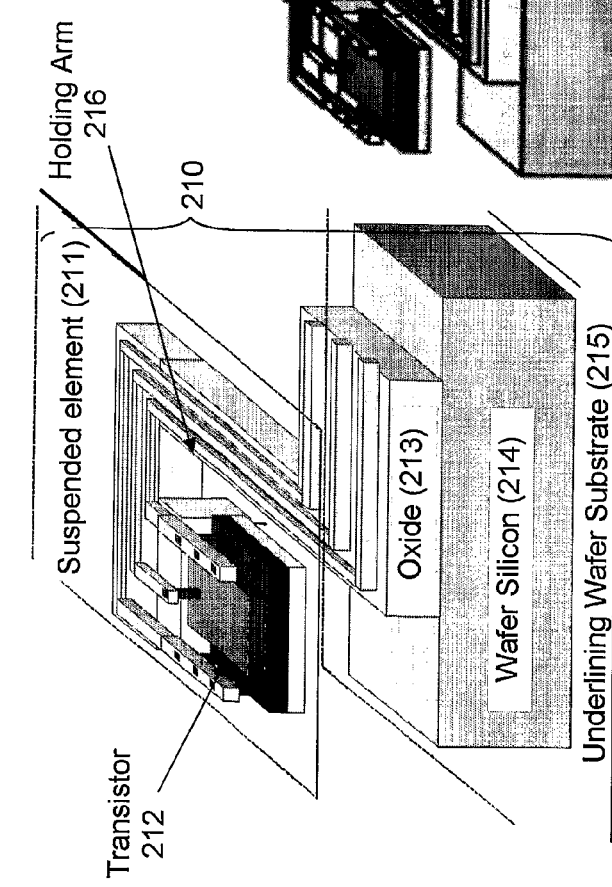
FIG. 2c is an array of TeraMOS sensors, schematically showing four sensors in accordance with FIG. 2b.
Figure 2B:
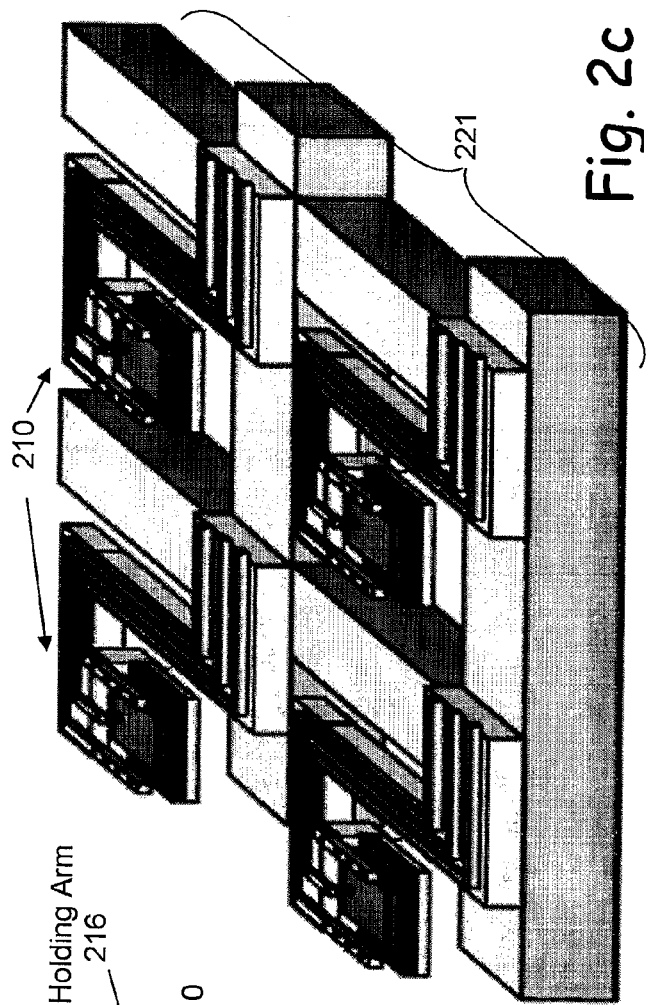
FIG. 2b is a single TeraMOS sensor, constructed in accordance with the principles of the invention.

FIGS. 2a-2c are schematic illustrations of the TeraMOS sensor, constructed according to the principles of the present invention.

FIG. 2a is a schematic cross-section of a suspended (released) CMOS transistor 212, held by holding arm 216. The TeraMOS sensor is a thermally isolated micro-machined (released) CMOS transistor, preferably operating at sub-threshold. The schematic cross-section shows the buried oxides 220 along with the additional features of the micro-machined cavity 217 and silicon bulk 218. The CMOS transistor is implemented on an SOI substrate, using Deep Reactive Ion Etch (DRIE) micromachining backside etching, as described in FIG. 9 below.

The CMOS transistor operates preferably in the sub-threshold regime, so that the measured temperature coefficient of the current (TCC) can achieve values of more than 4%/K (see the references of the prior art for more details), far better and more uniform than the typical 2-3%/K in state of the art micro-bolometers. In addition, the relative 1/f noise contribution of the TeraMOS operating at sub-threshold is much reduced, since the currents are low and the surface passivation technology of the CMOS is superior compared to conventional bolometers, FIG. 2b shows a perspective view of the TeraMOS device obtained by standard CMOS-SOI processing and MEMS post-processing. FIG. 2b shows a single sensor 210. Single sensor 210, which provides a single pixel image, has five identified parts: a suspended element 211, which includes a transistor 212; a buried oxide layer 213; the silicon wafer handle layer 214; the underlining bottom substrate 215, which forms a quarter-wavelength resonator; and the holding arm 216.

FIG. 2c is an array of sensors 221, showing an exemplary group of four of the single sensors 210 of FIG. 2b.

Figure 2D:
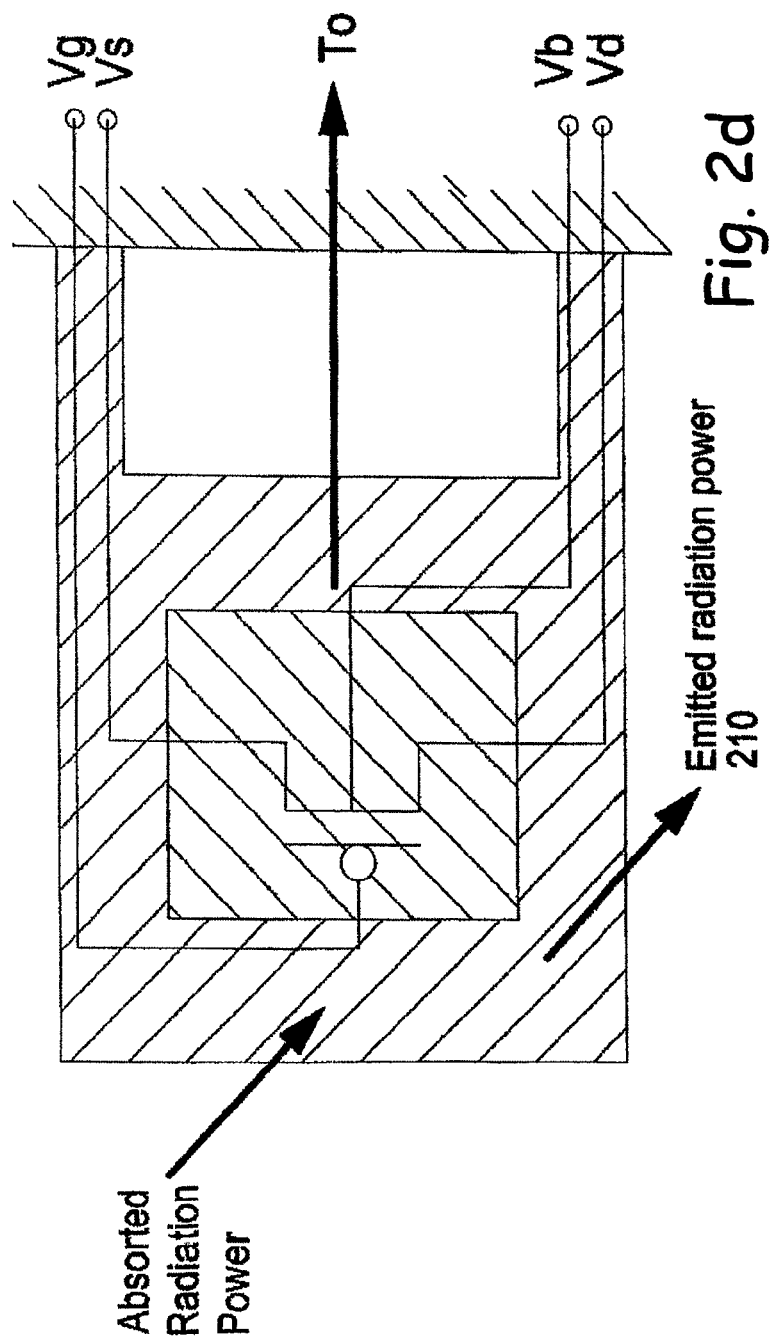
FIG. 2d is a schematic diagram of a released TeraMOS sensor, connected to the silicon die; by the transistor interconnects, constructed according to the principles of the present invention.

FIG. 2d is a schematic diagram showing an overview of a released TeraMOS sensor, connected to the silicon die by the transistor interconnects, constructed according to the principles of the present invention. The TeraMOS sensor is a thermally isolated transistor operating preferably at sub-threshold. The concept of operation of the TeraMOS sensor is similar to the concept of the micro-bolometer. Radiation absorption in a micro-machined membrane increases its temperature and the temperature change is transduced into a voltage or current change. $\Gamma\Delta T=Gt\ \Delta T$ is the power 210 flowing to the surroundings, mainly through the interconnects to the gate, source, bulk and drain and denoted by $V_G$, $V_S$, $V_B$ and $V_D$. The absorbed radiation is preferably stored in the sensor, thereby increasing its temperature. Thus, it is necessary to reduce power 210 flowing to the surroundings. Therefore, the transistor is released by the MEMS process and the surrounding medium is evacuated to reduce air conductance. The micro-machined released transistor is held in vacuum by the interconnects. The interconnects provide conductance to power 210. Hence, a design where the number of interconnects is reduced is preferred. This is achieved if the bulk and source are internally shortened, and the gate and the drain are internally shortened. Thus, such a diode-like connection, resulting in only two interconnects, is preferred.

Furthermore, a cantilever design is preferred, where there is only one holding arm with the interconnects, as described in FIG. 3 below. Such a design is preferred for better thermal isolation as well as better mechanical design (see below).

Figure 3:
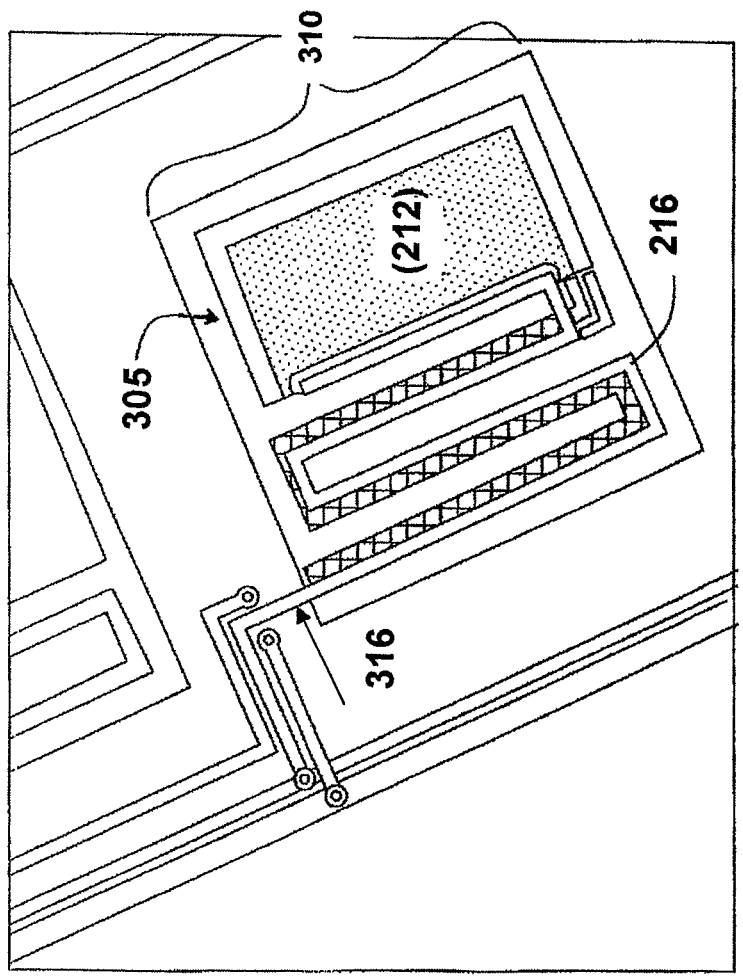
FIG. 3 is an illustration of a pixel with a suspended and released-transistor after MEMS post-CMOS processing has been applied, constructed according to the principles of the present invention (the perforated platform is not included)

FIG. 3 is an illustration of a pixel 310 with a suspended micro-machined transistor 212 after MEMS post-CMOS processing, constructed according to the principles of the present invention as well as the principles of the invention of Ref. 1. Micro-machined, thermally isolated transistor 212 is suspended by holding arm 216 in a vacuum environment 305. Holding arm 216 provides electrical contacts and mechanical support to transistor 212, as well as thermal isolation. Transistor 212 is only a few microns thick, and is suspended in vacuum 305

The cantilever design of FIG. 3, where the holding arm is connected to the silicon die just in one side 316, is preferred mechanically, since this design allows the release of vertical and longitudinal stresses that may be introduced during the MEMS post-processing. The holding arm 216 of FIG. 3 described below is designed as a serpentine-like structure to increase thermal isolation. Other designs are based on an encompassing holding arm as described in FIG. 4a below.

FIG. 3 does not illustrate all of the relevant aspects of the TeraMOS sensors. To meet the performance requirements of the Terahertz sensors (the TeraMOS) additional features are required, as outlined below.

FIGS. 2a-d and FIG. 3 are provided to illustrate the concept of the use of a released, thermally isolated CMOS-SOI-MEMS transistor as a thermal sensor. The use of such a suspended (released) transistor 212 of FIG. 2a as the sensing element for infrared (IR) radiation has previously been proposed by the inventor of the present invention under the name of TMOS [see prior art reference 1], and the advantages and performance of this "active bolometer" have been reported [see prior art references 2-6].

However, the pixel dimensions and the details of electrical and thermal design depend on the wavelength which needs to be detected and are therefore very different for an infrared TMOS sensor and a TeraMOS sensor. A TeraMOS sensor for 1.5 THz radiation requires a pixel of about 200 microns by 200 microns and a completely new design is required to obtain the required low thermal mass and the required thermal time constant for video format operation. Moreover, A TeraMOS sensor for 0.5 THz radiation requires a pixel of about 600 microns by 600 microns.

Thus, the present invention differs from the former TMOS (prior art reference 1) by completely different pixel dimensions, by introducing possible operation at cryogenic temperatures, such as 77° K, and by additional technological and physical design features, as outlined below. Before presenting these additional features the following discussion presents a definition of the design goals for the TeraMOS sensor:

1. The thermal conductivity $G_{th}$ should be equal or less than $5 \cdot 10^4$ Watt/K and preferably corresponding to $1 \cdot 10^4$ Watt/K;
2. The thermal time constant τ should be up to 70 msec and preferably corresponding to 20 msec. The goal is to correspond to video formats with the typical frame rate of 30 Hz or 15 Hz but modifications may be required and introduced.
3. The thermal mass $C_{th}$ is estimated by $$\tau_{th} = \frac{4}{\pi^2} \frac{C_{th}}{G_{th}}.$$

It is shown in the above equations that in order to meet the above requirements simultaneously, the thermal capacitance of the pixel, denoted by $C_{th}$, must be reduced. Therefore, the perforated design of FIG. 4 is provided as follows.

FIGS. 4a-4d illustrate the design of the TeraMOS sensor with a perforated platform constructed according to the principles of the present invention.

Figure 4A:
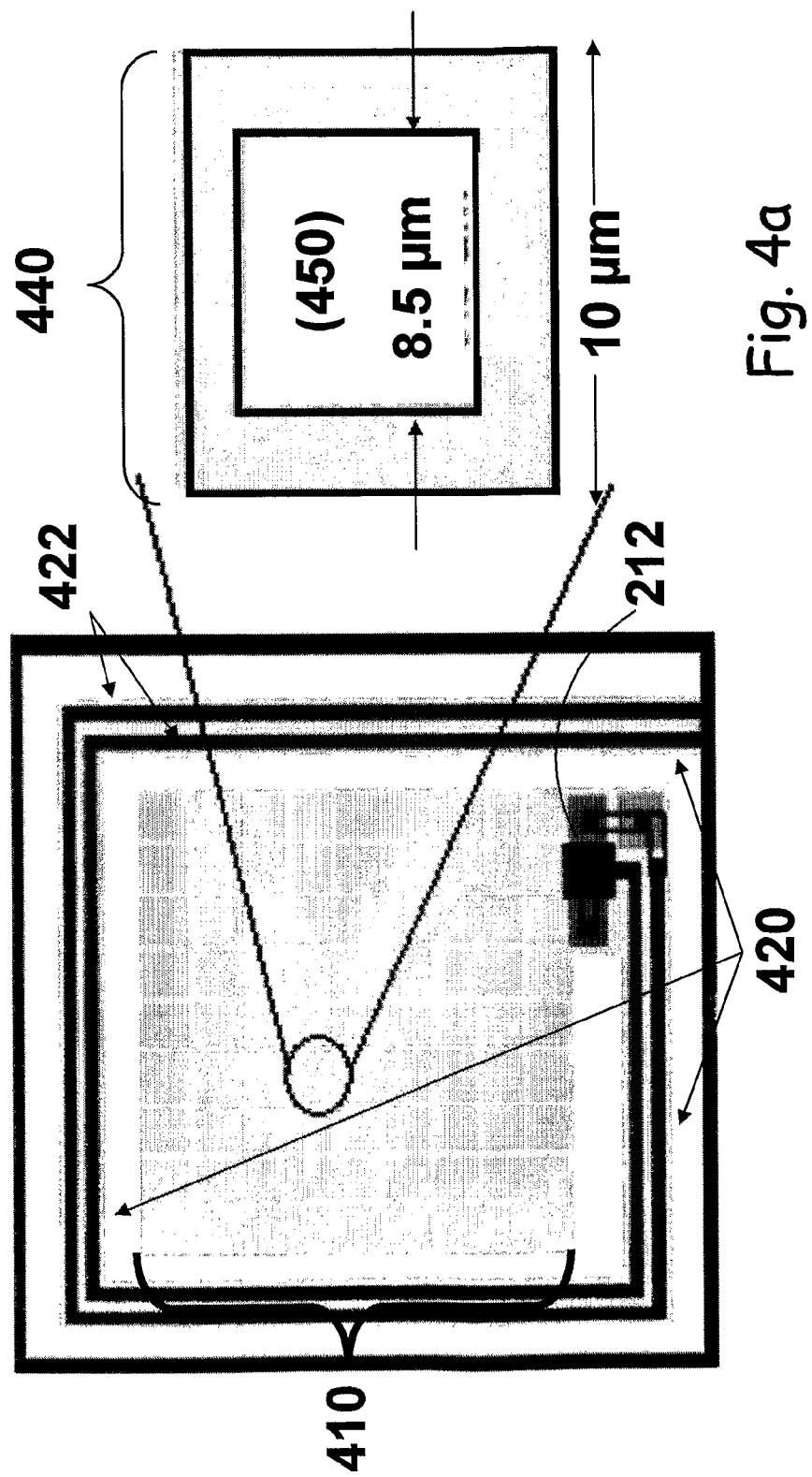

FIG. 4a generally illustrates the design of a TeraMOS transistor with a perforated platform. The perforated platform (membrane) 410 absorbs the radiation. The encompassing holding arm 420 provides thermal isolation and the electrical contacts 422 (these are the 2 contacts needed to measure the transistor) to the MOS transistor 212, which measures the temperature change. In this design, transistor 212 is connected in a diode-like configuration. The gate and drain are shortened and the source and bulk are shortened. Transistor 212 is designed as a small element, shown as a dark rectangle connected to holding arm 420, using two interconnects 422 which are positioned on top of the buried oxide and are part of the holding arm. The dimensions are in microns (um).

The enlarged rectangle to the right side illustrates the perforated structure. The outer frame 440 is the solid portion of the frame of platform 410, while the inner white rectangle 450 represents the holes etched by the MEMS post-processing.

Perforated platform 410 is connected to the substrate by encompassing holding arm 420. There are two interconnects 422 on holding arm 420. Interconnects 422 on holding arm 420 are also shown in FIG. 4d.

Figure 4B:
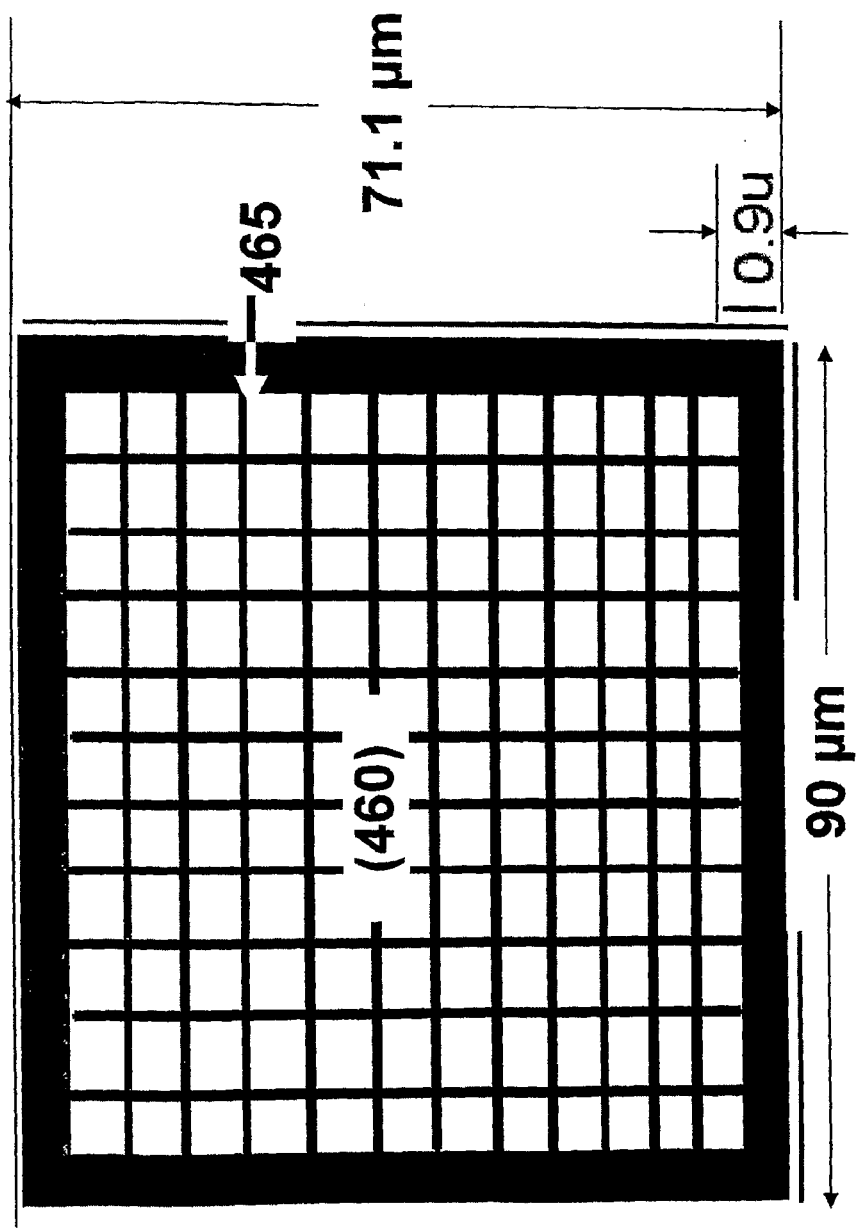

FIG. 4b schematically illustrates the dimensions of a perforated platform for an exemplary pixel 460 of 100 microns by 100 microns. The dimensions are in microns (um). An inner rectangle 465 is detailed in FIG. 4c below.

FIG. 4c is a schematic illustration for a typical design of inner square 465 of FIG. 4b. The dimensions are for illustration only and can be modified. The typical dimension of the etched inner hole 461 (the white square) should be less than the wavelength divided by 10. The frame is made of the buried oxide, the polysilicon layer and metal 1. The dimensions are in microns (um).

Figure 4D:
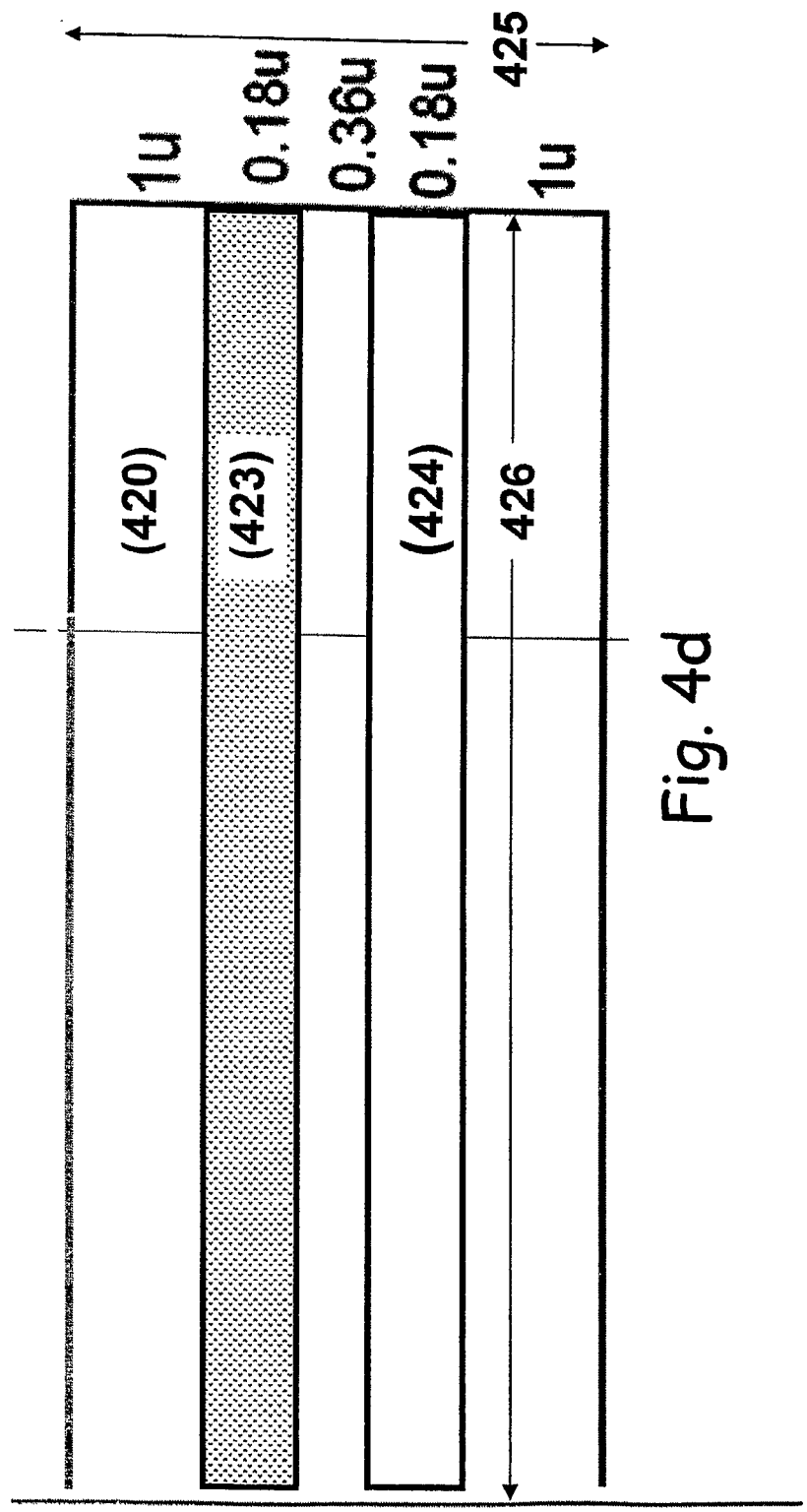

FIG. 4d is an exemplary overview of the design of the holding arm, where the electrical interconnects are implemented. The dimensions are in microns (u). The shaded stripe is an inter-connect implemented in polysilicon 423, providing the electrical contacts to the gate and drain. The clear stripe is an inter-connect implemented in active silicon 424, providing contacts to the source and bulk. In FIG. 4d, arm 420 is illustrated as 2.72 μm wide 425 and 63 μm long 426, but these dimensions are non-limiting examples.

In order to further clarify the inventive perforated platform described above, the cross sections of the sensing transistor, the holding arm and platform, are given in FIGS. 5a and 5b, as described below. The dimensions and specific layers here correspond to a 1 micron CMOS-SOI process provided by a commercial Fab (XFAB in Germany). They are used to illustrate visually the concept. The present invention is not limited to these dimensions and layers.

FIG. 5a illustrates the cross-section of the sensing transistor, constructed according to the principles of the present invention. FIG. 5a includes the layers compromising the released (micro-machined) transistor: the buried oxide 510, the active silicon 520, the polysilicon gate 530, the metal 1 layer 540 providing contacts to the source and drain as well as the inter-level dielectric (ILD) 550. The dimensions included in FIG. 5a are for illustration only and refer to devices fabricated in a commercial FAB using 1 micron CMOS-SOI technology and released during post-processing at the Technion, Haifa, Israel. A more advanced process, such as CMOS-SOI 0.18 micron process, also available commercially, will provide a transistor with similar layers but with different dimensions. Regardless of the process, the thickness of the cross-section of the transistor is larger than that of the holding arm.

The cross-section of a transistor must include polysilicon gate 530 as well as metal 1 540, and hence it is thicker than the cross-section of the holding arm, as described in FIG. 5b below. Since it is important to reduce the thermal mass of the TeraMOS sensor, according to the present invention, the TeraMOS platform, which absorbs the radiation, may be designed with a cross-section of the holding arm, while the transistor is smaller in dimensions, as shown in FIG. 4a and FIG. 6. The transistor 620 of FIG. 6 or the transistor 212 of FIG. 4a is smaller than the perforated platform. The cross-sections of the holding arm and the perforated platform are the same.

Figure 5B:
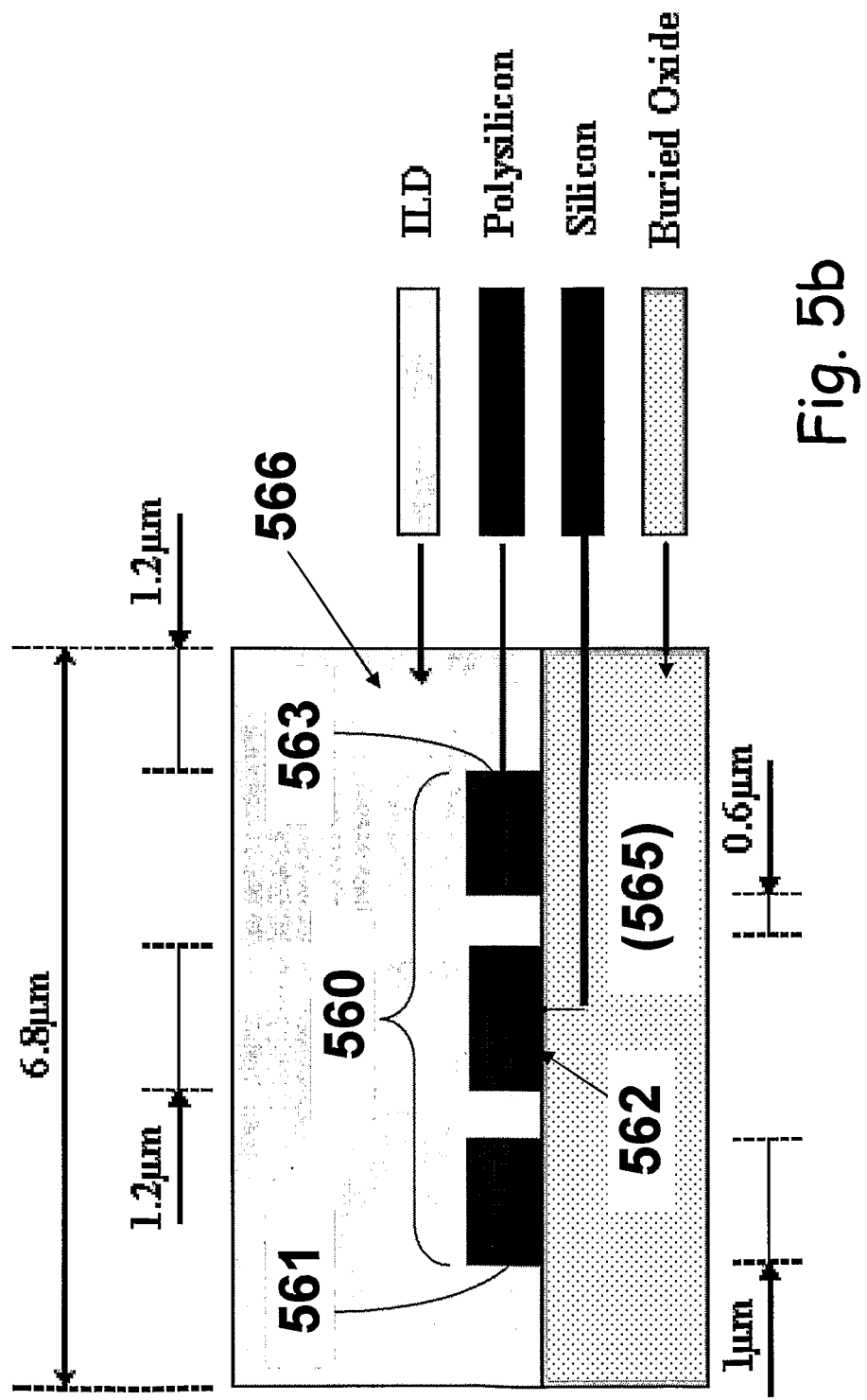

FIG. 5b is a schematic illustration of a cross-section of a released holding arm of TeraMOS transistor, constructed according to the principles of the present invention. The arm 560 is shown with three interconnects 561, 562 and 563.

The cross-section includes: the polysilicon interconnects 561 and 563, the active silicon interconnect 562 and the buried oxide 565. The interlayer dielectric ILD 566 is also shown. An alternative diode-like design would include only 2 interconnects based on active silicon and polysilicon.

Figure 6A:
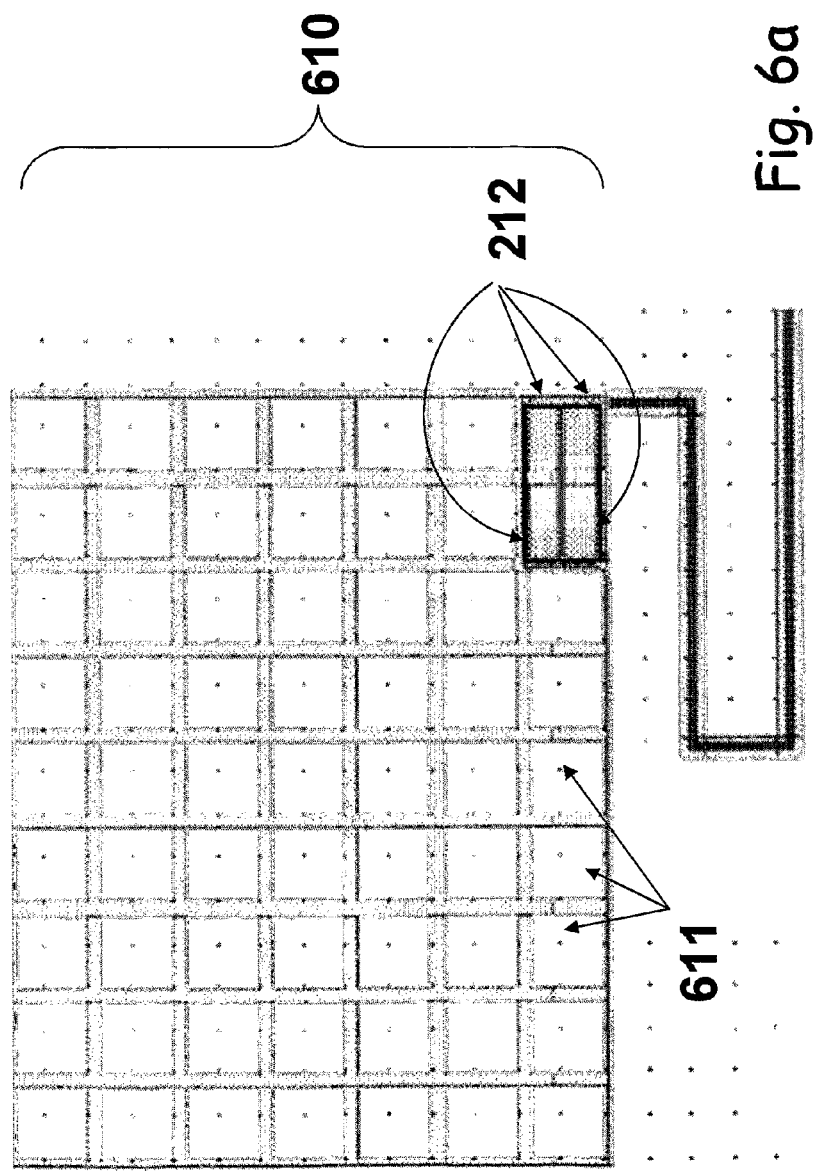
FIG. 6a shows a typical design of a perforated pixel and TeraMOS sensor with several "fingers," thereby illustrating transistors connected in parallel, constructed according to the principles of the present invention.

FIG. 6a is a schematic illustration of a typical design of a perforated platform 610 (shown as 410 in FIG. 4a) and TeraMOS sensor with several "fingers" and hence transistors 212 connected in parallel, constructed according to the principles of the present invention. The holes have typical dimensions described with reference to FIGS. 4a, 4b and 4c above. The platform with the holes 611 has the cross section described with reference to FIG. 5b. Transistors 212 are located in the corner, with the cross-section of FIG. 5a. The location of the transistor on the platform may be optimized and the corner location is just for illustration.

The sensing transistor 212 is designed in "fingers" to increase the total current of the transistor, while still remaining in sub-threshold. A larger current provides a larger responsivity for the sensor.

Figure 6B:
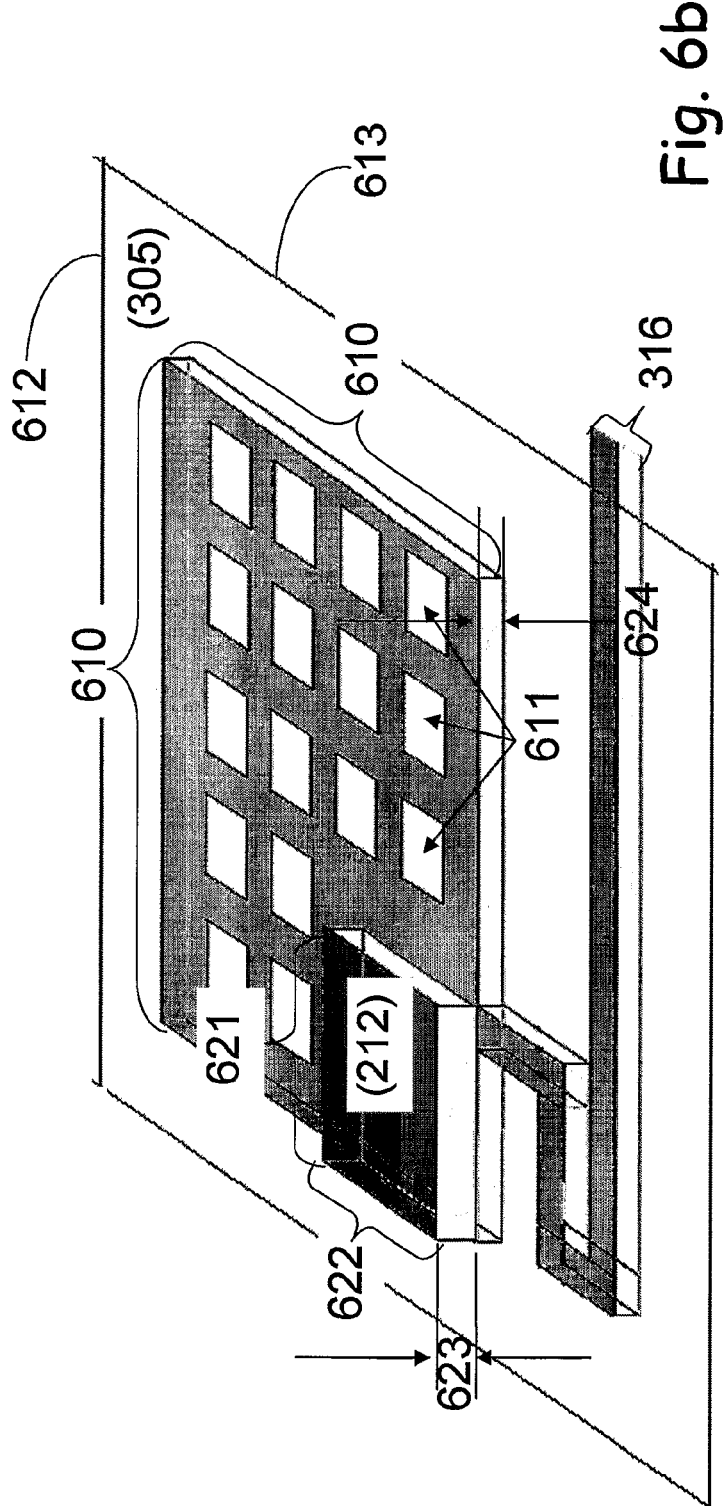
FIG. 6b is a perspective view of a pixilated platform with side dimensions and holes (white squares), constructed according to the principles of the present invention.

FIG. 6b is a perspective view of a perforated platform 610 with side dimensions 612 and 613, and holes 611, constructed according to the principles of the present invention. The cantilever serpentine-like holding arm 216 is also shown in overall vacuum environment 305. Transistor 212 is portrayed in the raised region with side dimensions 621 and 622. The cross-section 623 of the transistor is thicker than the platform and holding arm thickness 624. The transistor is designed on perforated platform 610 which absorbs the radiation. The dimensions of the perforated platform are A×B, and the dimensions of the transistor are a×b.

Figure 6C:
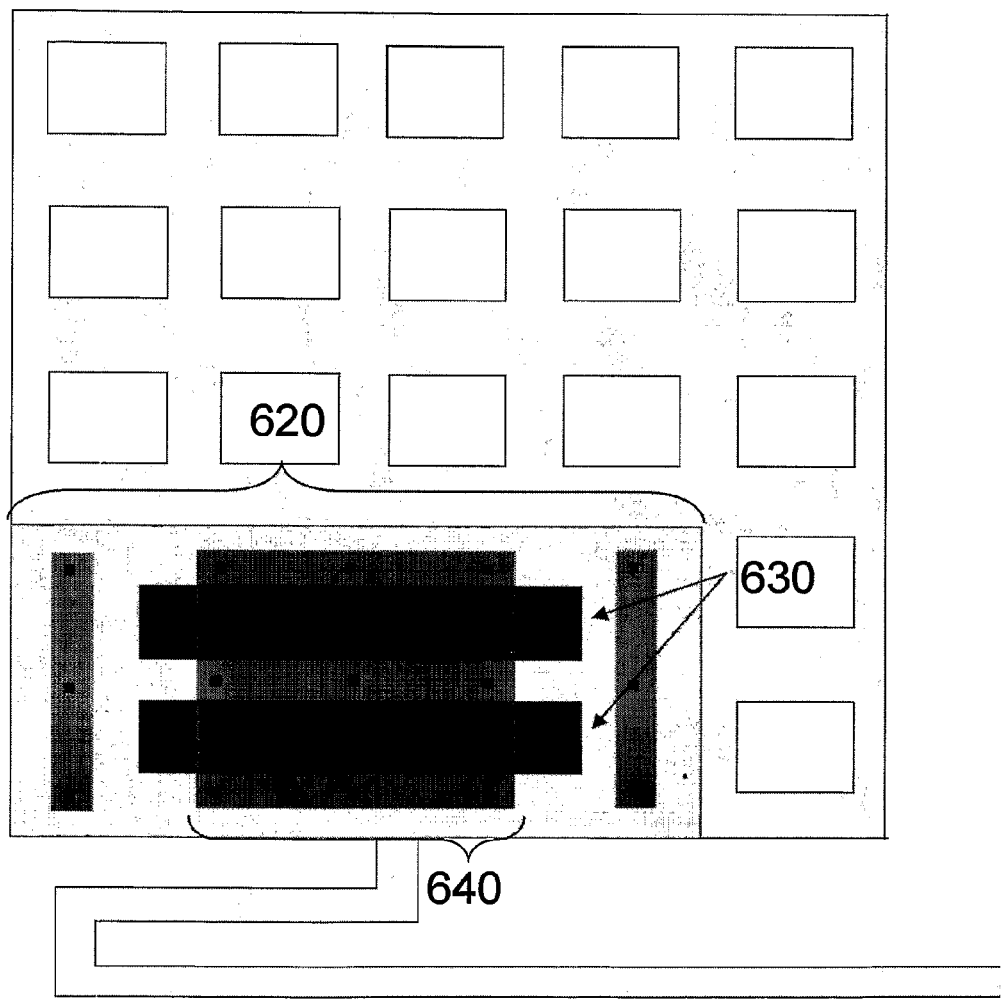
FIG. 6c is an overhead view of the pixel of FIG. 6b, constructed according to the principles of the present invention.

FIG. 6c is an overhead view of the pixel of FIG. 6b, constructed according to the principles of the present invention. Transistor 620 is composed of two polysilicon gates 630 positioned in parallel over the active area 640, where the source and drain diffusions are implemented.

The number of fingers and typical dimensions may vary, according to the CMOS-SOI fabrication technology. W is the transistor width (in microns) and L is the transistor length (in microns), Typically L is at least twice the technology channel length (0.18 micron in the case of the IBM CMOS-SOI process known as IBM CSOI7RF MPW) to avoid short channel effects and W/L is of the order of 10.

The Terahertz radiation may be coupled with the TeraMOS sensor by the well-established method of on-chip antennas, as employed in the well-established antenna coupled bolometers. However, in accordance with the present invention, a preferred embodiment is to apply direct coupling by designing a "λ/4" absorber, as described in FIG. 7 below.

FIGS. 7a-b are schematic illustrations of a "λ/4" optical absorber with a separate backside conducting reflector die 702, constructed according to the principles of the present invention. A "λ/4" optical absorber is implemented with the use of a separate backside reflector die, in addition to the TeraMOS Focal Plane Array (FPA) die. The CMOS-SOI-MEMS FPA 704 is positioned "looking down," with the CMOS transistors at plane 706 facing the backside reflector 702 encompassing a vacuum environment 710. A thin metallic layer 708 of either titanium or NiCr is deposited on the rear side of buried oxide 220 to achieve impedance matching with the incident radiation. The impedance matching between incident electromagnetic radiation 714, with characteristic impedance of 377Ω per square, and metallic layer 708, is achieved by evaporation of a thin metallic layer 708 of either titanium or NiCr on the buried oxide (as post-processing) and positioning the die with "backside illumination." The sensors and readout circuitry are on plane 706 shown in FIG. 7b and are looking down towards backside reflector 702. Thin metallic layer 708 is of the order of ~40 A, with the thickness corresponding to the resistance per square needed to achieve impedance matching with the incident radiation, and is deposited on the buried oxide of the SOI die as a post processing step.

The "λ/4" absorber is based on the Salisbury screen concept, which functions on the principle of matching impedances. Because conducting ground plane 702 is separated from FPA die 704 by a distance of λ/4, where λ is the wavelength of the incident radiation, the zero ohm impedance of the ground plane is transformed to an open circuit at FPA 704. FPA 704 presents impedance parallel to the transformed open circuit. When a plane wave 712, traveling through space along a direction 714 normal to the FPA die arrives, it is absorbed. This is because the impedance of FPA 704 exactly matches the impedance of arriving plane wave 712.

The Salisbury screen concept is well-known but here it is applied to the TeraMOS sensors in a unique manner. According to the present invention, the terahertz radiation 714, which is to be detected, is dissipated in the perforated platform, which is part of the plane 704 and as a result the perforated platform increases its temperature. The sensing transistor is part of the perforated platform, but may be smaller in its lateral dimensions, as indicated by FIGS. 3, 4a and FIG. 6. This provides design flexibility since the platform may be large while the transistor may be small. In addition, the optical/electromagnetic radiation coupling with the sensor, may be based on direct coupling and not necessarily on the antenna coupled approach encountered in bolometers for sensing terahertz radiation:

The filtering of IR radiation is achieved by using an appropriate lens, provided with appropriate optical filter and optionally cooled to 77° K, if required.

Furthermore, the design shown in FIGS. 4-6 enables use of the innovative variable pixel approach ("tiling") described in the following paragraphs.

The side dimension of the pixels should be of the order of the detected wavelength. For example: 1.5 THz radiation requires pixels with 200 microns pitch while 0.5 THz radiation (wavelength of 600 μm) requires pixels with 600 μm pitch. In order to meet the design requirements, namely thermal time constant of less than 70 msec while retaining thermal conductance of the order of $1 \cdot 10^{-8}$ Watt/K, the "tiling" concept is introduced. The basic "tile" (or sensing "building block") may be either with 200 micron pitch or may be with 100 micron pitch. In the latter case, a pixel of 200 microns pitch will be composed by 4 tiles, each acting as an individual sensor and each with 100 micron pitch. The reading of the 4 sensors is added by the integrated readout. A pixel of 600 micron pitch will be composed by 6*6 tiles of side length 100 micron each. The CMOS-SOI-MEMS approach of the monolithic FPA, where the MEMS is applied as post-CMOS processing, allows for straightforward integration of sensors and readout.

Thus, for 1.5 THz radiation (wavelength of 200 μm), pixels of $(200\,\mu m)^2$ are adequate. These pixels may be composed of 2*2 sensors, each with dimensions of $(100\,\mu m)^2$. The reading of the 2*2=4 sensors will be added by the readout. However, for 0.5 THz radiation (wavelength of 600 μm), pixels of $(600\,\mu m)^2$ are required. Here, the reading of the 6*6=36 sensors may be added by the readout. It is therefore proposed to use the novel concept of variable effective pixel size, composed of combined reading of several pixels. This variable pixel approach enables the achievement of a wide frequency range of operation while dealing with the issue of the real estate available on a reasonably sized die: A die only slightly larger than 6 cm*6 cm provides an array of 256*256 pixels for 1.5 THz imaging and ~100*100 pixels for 0.5 THz imaging.

A 2D array of TeraMOS sensors has to be integrated with the readout circuitry in order to form a monolithic Focal Plane Array (FPA) for THz active or passive imaging, as shown schematically in FIG. 8, as described below. The 2D array is shown as 2×2 pixels, for example, in FIG. 2c. However, the TeraMOS sensor of the present invention is designed for the feasibility of arrays with 256×256 pixels, which will require a die of the order of 6 cm side length.

Figure 8:
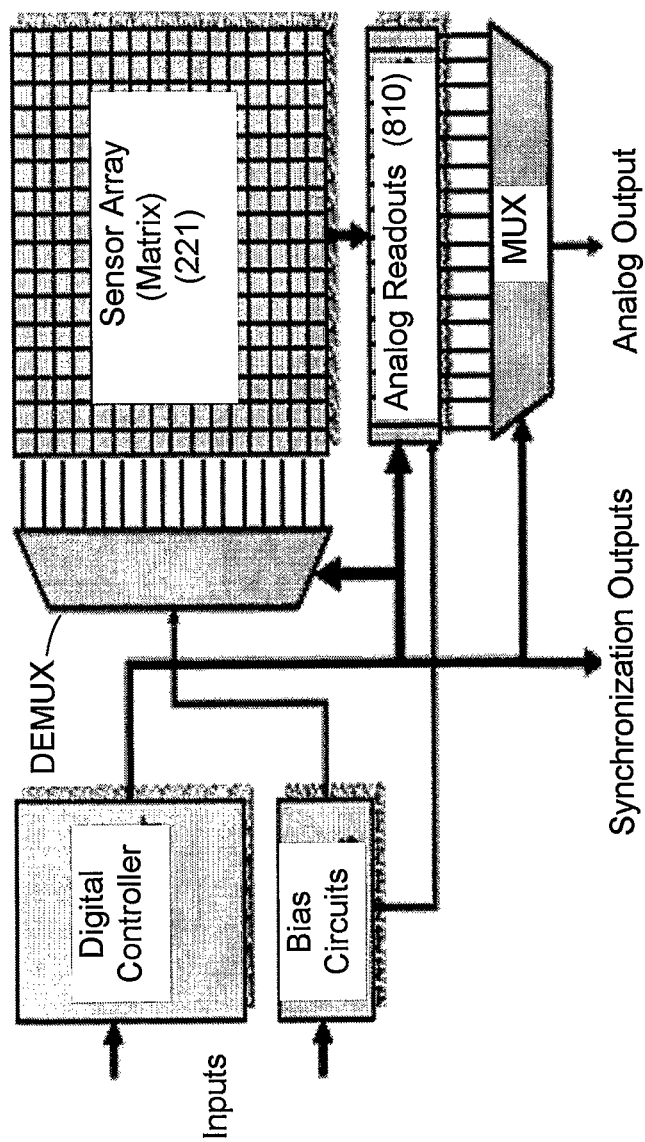
FIG. 8 is a schematic presentation of the FPA array of the TeraMOS imager, constructed according to the principles of the present invention.

FIG. 8 is a schematic presentation of the FPA array of the TeraMOS imager, constructed according to the principles of the present invention. Sensor array 221, having an exemplary 16×16 matrix, and the VLSI (very large scale integration) readout circuitry of the imager 810 are designed on the same die and fabricated by the same CMOS-SOI technology. The TeraMOS sensing transistors as well as the perforated platform are then released by MEMS post-processing.

The fabrication process for CMOS-SOI-MEMS FPA (Focal Plane Array) for Terahertz detection is described as follows.

The system is designed for a standard CMOS-SOi process in a commercial foundry, preferably with 0.18 micron technology or better. Unique built-in masks (see below) are integrated in the design. The MEMS processing is applied by post-processing. This approach results in relatively low-cost production.

The MEMS Fabrication is based on dry bulk micromachining and built-in masks. Every standard CMOS process includes several metallization layers. Upper metal layers made of aluminum are used to provide masking. Aluminum is unaffected by the fluorine plasma that is applied for the dry etching of the silicon and the inter-level dielectrics, since a protective layer of aluminum fluoride is formed on the surface. The use of the built-in masks (metal 2 for the sensor and metal 1 to mask the holding arm and the platform) grants the alignment accuracy and resolution provided by the CMOS process, and significantly reduces the fabrication cost. Metal 3 (the highest metal layer) provides the bonding pads.

The fabrication approach was demonstrated in the TECHNION-Israel Institute of Technology for the TMOS sensor, as described with reference to FIG. 9 below.

DRIE (Deep Reaction Ion Etch) anisotropic bulk micromachining is applied to remove the silicon handle 960 while the buried oxide 950 (shown as 220 in FIG. 2a) serves as etch stop. Front-side RIE (Reactive Ion Etch) etching of the inter-level dielectrics (ILD) 940 (shown as 566 in FIG. 5b) is applied to release the sensor and the holding arm. ILD is removed from the exposed regions down to the handle silicon, while the metals 933 and 932 serve as a self-aligned etch stop of the oxide of the ILD 940.

The final step is removal of the masking metals. Metals 2 932 and 3 933 are made from aluminum, which is not etched by the fluorine plasma of the RIE process. In addition, metal 1 931 includes adhesion/barrier under layers of titanium and titanium nitride. More advanced CMOS-SOI processes may incorporate copper for Metal 1. Since copper metallization is also unaffected by the RIE plasma (which does not include chlorine), the concept of FIG. 9 may be applied successfully to the more advanced processes as well.

Thus, the above describes the fabrication process based on the metallization layers provided by a specific foundry. A different foundry may provide different metallization layers and modifications may be required but these modifications are based on the concept of FIG. 9.

Figure 9:
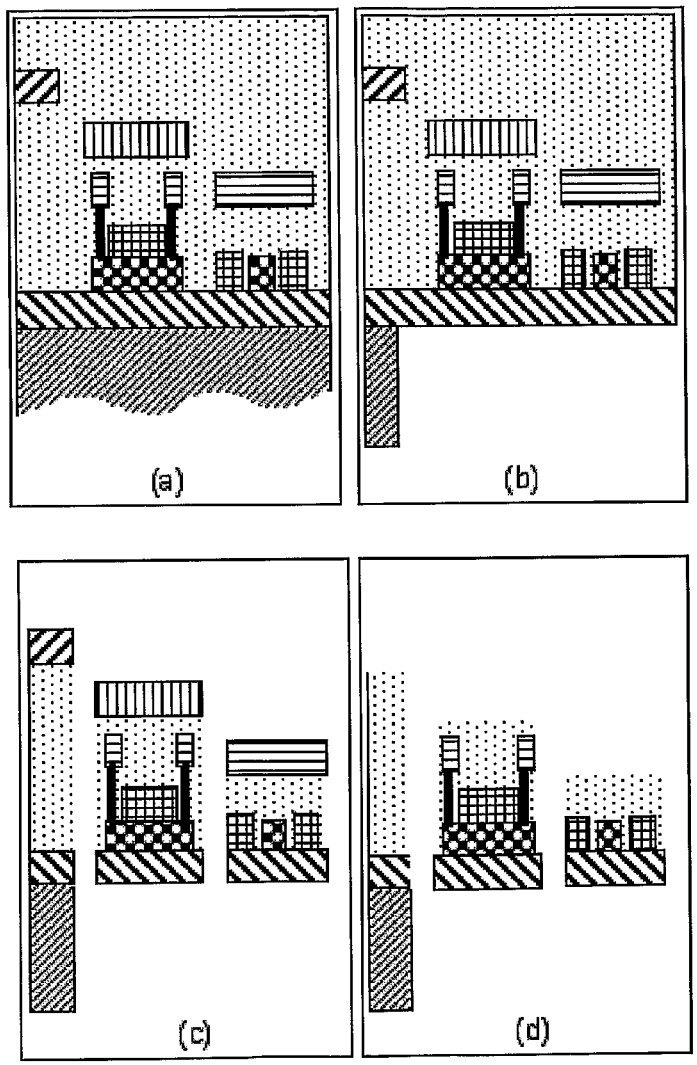
FIG. 9 is a series of schematic illustrations of the main steps of the TMOS/TeraMOS fabrication process, constructed according to the principles of the present invention.

FIG. 9 is a series of schematic illustrations of the main steps of the TMOS/TeraMOS fabrication process, constructed according to the principles of the present invention. The TeraMOS fabrication is based on dry bulk micromachining using built-in masks of a standard CMOS-SOI design. First apply Deep Reactive Ion Etch (DRIE) anisotropic bulk micromachining, using $SiO_2$ and Photoresist masks, to remove the silicon wafer 960 while the buried oxide 950 serves as etch stop. Then apply Reactive Ion Etching (RIE) from the front side to fully release the transistor and holding arm from the inter-level dielectric ILD 940 encompassing the transistor, which are not protected by the built in masks of Metal 1 931 and metal 2 932. Active silicon material 910 and poly interconnect material 920 are protected according to the required design by the designed built-in masks.

The use of the built-in masks, metal 2 932 for the TeraMOS transistor body and metal 1 931 for the holding arm, enables the alignment accuracy and resolution provided by the CMOS process, and significantly reduces the fabrication cost. In the last stage, one etches the aluminum masks, namely metal 2 932 above the transistor and metal 1 931 above the holding arm. Metal 3 933 provides the bonding pads, which are protected during the last etch by a low cost, low accuracy soft (photoresist) mask. ILD material 940 and Buried Oxide (BOX) material 950 are shown, accordingly.

The challenge in the post-processing described above is to completely release the transistor while fully retaining its electrical performance. This has been achieved as indicated by the measured I-V and noise characteristics of the released device, compared with the original device before applying the MEMS post-processing. The device current, TCC, the subthreshold slope and the threshold voltage of the "virgin" and released MOS transistors practically coincide, indicating both that the electrical performance is not affected by the post processing and that the self heating of the thermally isolated transistor is negligible.

The packaging concept for the Terahertz Focal Plane Array sensing system is now presented.

To increase performance and reduce noise, vacuum encapsulation is required and cooling to 77° K may be required. The use of Stirling coolers, which are used in Israel for IRFPAs-Infra Red Focal Plane Array, is proposed. These coolers provide adequate cost and performance. The CMOS-SOI-MEMS FPA is integrated on the cold finger of the dewar while all the drivers and supporting electronics is mounted on a PC board which is positioned on the case of the Stirling cooler. Thus, a compact design and system is achieved, corresponding to the well-established packaging of IRFPAS, as has been demonstrated.

Having described the present invention with regard to certain specific embodiments thereof, it is to be understood that the description is not meant as a limitation, since further modifications will now suggest themselves to those skilled in the art, and it is intended to cover such modifications as fall within the scope of the appended claims.

The invention claimed is:

1. A device comprising: a single crystal silicon-on-insulator (SOI) bulk layer; at least one thermally isolated Metal Oxide Semiconductor transistor (TeraMOS transistor) with temperature dependent electrical parameters; an absorption structure for the absorption of terahertz radiation; wherein the absorption structure comprises a perforated platform that is bigger than each of the at least one TeraMOS transistor; electrical and thermal conductors independently connecting said at least one TeraMOS transistor to said single crystal SOI bulk layer; and CMOS circuitry with readout circuits for sensor signal multiplexing, amplification and processing, wherein said absorption structure absorbs terahertz radiation and heats the at least one TeraMOS transistor that transduces temperature changes into an electrical signal.

2. The device of claim 1, wherein the at least one TeraMOS transistor is designed to operate at sub-threshold region of operation.

3. The device of claim 1, wherein the at least one TeraMOS transistor is not limited to operate at sub-threshold region of operation.

4. The device of claim 1, wherein the at least one TeraMOS transistor operates at subthreshold and at an optimal operating point determined by its gate voltage, wherein the temperature sensitivity and the current responsivity are highest.

5. The device of claim 1, wherein said absorption structure is at least twenty times bigger than the TeraMOS transistor.

6. The device of claim 1, wherein said absorption structure comprises a coupled antenna.

7. The device of claim 1, wherein said perforated platform comprises an array of frames and inner holes.

8. The device according to claim 7 wherein each frame of the array of frames comprises multiple facets and wherein a width of each facet of each frame is smaller than a width of an inner hole surrounded by the frame.

9. The device of claim 1, wherein said CMOS circuitry with readout circuits is integrated with an array of TeraMOS transistors, thereby forming a monolithic focal plane array (FPA) comprising a 2-D array of pixels for THz imaging systems.

10. The device of claim 1, comprising a plurality of tiles, each tile comprises one or more TeraMOS transistors and is arranged to operate as an individual sensor, wherein the CMOS circuitry is arranged to add readings of multiple tiles to provide a pixel.

11. The device of claim 10, wherein a number of tiles that form a pixel is based on a wavelength of a terahertz radiation to be sensed by the pixel.

12. The device of claim 10, wherein a number of tiles per pixel is a linear function of a wavelength of terahertz radiation to be sensed.

13. The device of claim 1, wherein the TeraMOS transistor comprises drain, gate, bulk and source terminals, wherein said drain and gate terminals are connected to each other and said bulk and source terminals are connected to each other.

14. The device of claim 1, wherein said thermally isolated TeraMOS transistor and the surrounding medium is evacuated to reduce air conductance.

15. The device of claim 1, packaged inside a dewar and cooled to cryogenic temperatures by a closed cycle cooler.

16. The device of claim 15, wherein said cooling is in the range of 77° K using closed cycle Stirling coolers.

17. The device of claim 15, wherein said packaging provides vacuum encapsulation as well as cooled operation at cryogenic temperatures.

18. The device of claim 1, wherein the perforated platform is connected to the SOI bulk layer by a holding arm.

19. The device of claim 1, wherein said perforated platform is thinner than a cross section of the at least one TeraMOS transistor.

20. The device of claim 1, comprising a thin metallization layer located on a buried oxide layer, for impedance matching, wherein the at least one TeraMOS transistor element faces down towards a backside reflecting conducting wafer.

21. The device of claim 1, wherein the at least one TeraMOS transistor and the perforated platform are decoupled.

22. The device of claim 1, wherein several TeraMOS transistors are coupled to each other to provide a single sensing element; wherein several gates of several TeraMOS transistors are coupled to each other.

23. The device of claim 1, comprising a focal plane array that operates in a range of 0.5-1.5THz.

24. The device of claim 1, comprising a focal plane array that is not limited to the range of 0.5-1.5THz.

25. The device of claim 1 wherein the perforated platform forms a quarter-wavelength absorber with a separate backside reflecting conducting wafer.

26. A method for producing a device, the method comprising: providing a single crystal silicon-on-insulator (SOI) bulk layer; providing at least one thermally isolated Metal Oxide Semiconductor (TeraMOS) transistor with temperature dependent electrical parameters; providing electrical and thermal conductors independently connecting the at least one TeraMOS transistors to said single crystal SOI bulk layer; providing an absorption structure for the absorption of terahertz radiation; and providing CMOS circuitry with readout circuits for sensor signal multiplexing, amplification and processing, wherein the absorption structure comprises a perforated platform that is bigger than each one of the at least one TeraMOS transistor; wherein the absorption structure is arranged to absorb terahertz radiation and to heat the at least one TeraMOS transistor that is arranged to transduce temperature changes into an electrical signal.

27. The method of claim 26, comprising providing a plurality of metallization layers; said metallization layers comprise built-in front side etching masks comprising a first metal for a holding arm and a second metal for said TeraMOS transistor in order to provide alignment accuracy and resolution during the CMOS process and significantly reduce the fabrication cost; and removing the built-in front side etching masks.

28. The method of claim 27, wherein said built-in masks further comprise a third metal aluminum mask.

29. The method of claim 26, comprising: applying a CMOS-SOI process; applying a deep Reactive Ion Etch (DRIE) anisotropic bulk micromachining on the SOI bulk layer; and applying a Reactive Ion Etching (RIE) from a front side of the device to release the at least one TeraMOS transistor and a holding arm of the device from an inter-level dielectric layer encompassing the at least one TeraMOS transistor and the holding arm.

30. The method of claim 29, further comprising evaporating a thin metallic layer on the SOI bulk layer.

31. The method of claim 26, comprising providing the at least one TeraMOS transistor using Deep Reactive Ion Etch (DRIE) micromachining backside etching and either DRIE or Reactive Ion Etch (RIE) micromachining front side etching.

32. A method for sensing terahertz radiation, the method comprises: providing a device that comprises a single crystal silicon-on-insulator (SOI) bulk layer; at least one thermally isolated Metal Oxide Semiconductor (TeraMOS) transistor with temperature dependent electrical parameters; electrical and thermal conductors independently connecting the at least one TeraMOS transistors to said single crystal SOI bulk layer; an absorption structure for the absorption of terahertz radiation wherein the absorption structure comprises a perforated platform that is bigger than each of the least one TeraMOS transistor; and providing CMOS circuitry with readout circuits for sensor signal multiplexing, amplification and processing, wherein the absorption structure is arranged to absorb terahertz radiation and to heat the at least one TeraMOS transistor that is arranged to transduce temperature changes into an electrical signal; absorbing the terahertz radiation and heating the at least one TeraMOS transistor in response to the absorbing of the terahertz radiation, by the absorption structure; and transducing, by the at least one TeraMOS transistor, temperature changes resulting from the heating of the at least one TeraMOS transistor into an electrical signal.

* * * * *